(12) United States Patent
Nakamura

(10) Patent No.: US 8,038,230 B2
(45) Date of Patent: Oct. 18, 2011

(54) VEHICLE BRAKE HYDRAULIC PRESSURE CONTROLLER

(75) Inventor: Motoyasu Nakamura, Tomi (JP)

(73) Assignee: NISSIN KOGYO Co., Ltd., Ueda-Shi (JP)

( * ) Notice: Subject to any disclaimer, the term of this patent is extended or adjusted under 35 U.S.C. 154(b) by 1237 days.

(21) Appl. No.: 11/693,163

(22) Filed: Mar. 29, 2007

(65) Prior Publication Data
US 2007/0228820 A1    Oct. 4, 2007

(30) Foreign Application Priority Data

Mar. 31, 2006  (JP) ................................. 2006-101220
Mar. 31, 2006  (JP) ................................. 2006-101221

(51) Int. Cl.
*B60T 17/00* (2006.01)
(52) U.S. Cl. .............. 303/116.4; 303/119.3; 303/DIG. 3
(58) Field of Classification Search ............... 303/119.3, 303/116.4, DIG. 10
See application file for complete search history.

(56) References Cited

U.S. PATENT DOCUMENTS

| 5,655,569 | A | 8/1997 | Tackett |
| 5,735,314 | A | 4/1998 | Alaze et al. |
| 6,543,859 | B2 | 4/2003 | Sakamoto |
| 2002/0149259 | A1 | 10/2002 | Otomo et al. |
| 2007/0018498 | A1* | 1/2007 | Nakazawa ................. 303/119.3 |
| 2007/0159002 | A1 | 7/2007 | Otomo et al. |

FOREIGN PATENT DOCUMENTS

| EP | 1 251 052 | 4/2002 |
| JP | 64-015501 | 1/1989 |
| JP | 6-263017 | 9/1994 |
| JP | 8324406 | 12/1996 |
| JP | 10089302 | 4/1998 |
| JP | 10250568 | 9/1998 |
| JP | 10258724 | 9/1998 |
| JP | 10306879 | 11/1998 |
| JP | 2002264787 | 9/2002 |
| JP | 2002308078 | 10/2002 |
| JP | 2004069647 | 3/2004 |

OTHER PUBLICATIONS

European Search Report for EP Application No. 07006687.3-2423.
Office Action of Jun. 24, 2009 issue in the corresponding Japanese Application No. 2006-101220 (with concise English explanation).
Office Action of Jul. 7, 2009 issue in the corresponding Japanese Application No. 2006-101221 (with concise English explanation).

* cited by examiner

*Primary Examiner* — Bradley King
(74) *Attorney, Agent, or Firm* — Andrew M. Calderon; Roberts Mlotkowski Safran & Cole, P.C.

(57) ABSTRACT

A vehicle brake hydraulic pressure controller provided with a stroke simulator including a dummy cylinder includes a base member, a plurality of electromagnetic valves, a motor and pumps. The base member is constituted with a flow path in correspondence with a brake system. A plurality of the electromagnetic valves is attached to one face of the base member for controlling a flow of a brake fluid in the flow path. The motor is attached to other face constituting a back face side of the one face of the base member. The pumps are attached to a side face contiguous to the one face of the base member and are driven by the motor for delivering the brake fluid to the flow path. The dummy cylinder and the pumps are aligned at the base member with axis lines in a longitudinal direction being substantially in parallel with each other.

20 Claims, 24 Drawing Sheets

VEHICLE BRAKE HYDRAULIC PRESSURE CONTROLLER

This application is based on and claims the benefit of priority from the prior Japanese Patent Application No. 2006-101220, filed on Mar. 31, 2006 and No. 2006-101221, filed on Mar. 31, 2006, the entire contents of which are hereby incorporated by reference.

BACKGROUND OF THE INVENTION

1. Technical Field

The present invention relates to a vehicle brake controller. Particularly, the invention relates to a vehicle brake hydraulic pressure controller capable of being mounted mainly to bar handle vehicles such an automatic two-wheel vehicle, an automatic three-wheel vehicle and an all terrain vehicle (ATV). Further, the present invention relates to a low pressure accumulator used in a vehicle brake hydraulic pressure controller having a brake system interposed by a pump.

2. Background Art

There is known a vehicle brake hydraulic pressure controller for controlling a brake force in interlocking brakes of a front wheel and a rear wheel of a vehicle such an automatic two wheel vehicle or the like by increasing a hydraulic pressure by a pump (e.g., Patent Reference 1: JP-A-2002-264787). The apparatus includes a stroke simulator for exerting an operation reaction force in accordance with an operation state of a brake operation element.

A vehicle brake hydraulic pressure controller disclosed in Patent Reference 1 includes an electric brake hydraulic pressure control mode and a mechanical brake hydraulic pressure control mode. In executing the electric brake hydraulic pressure control mode, an operation reaction force in accordance with an operation state of a brake operation element is exerted to the brake operator by operating a stroke simulator. Further, when an abnormality occurs in executing the electric brake hydraulic pressure control mode, a constituent element related to the electric brake hydraulic pressure control mode is made OFF, the mode is shifted to the mechanical brake hydraulic pressure control mode, and a failsafe function can be realized by directly supplying a brake fluid pressure in correspondence with a brake operating amount to a wheel cylinder.

Meanwhile, according to the vehicle brake hydraulic pressure controller of the background art, in order to achieve the operation reaction force in accordance with operation state of the brake operation element, the stroke simulator is provided with a dummy cylinder for storing a brake fluid. However, it is necessary to provide a predetermined volume for the dummy cylinder for achieving the predetermined operation reaction force. When the dummy cylinder is provided on a base member of the vehicle brake hydraulic pressure controller, there is a necessity to avoid interference with other members needing a volume such as a pump and there is a concern of making a total of the apparatus large-sized.

Furthermore, according to a vehicle brake hydraulic pressure controller of a background art, when normal pressure increasing is carried out, there is carried out a control of applying a brake fluid pressure to a wheel brake by shutting off a flow path communicated with the wheel brake (wheel cylinder) from a master cylinder constituting a hydraulic pressure source and operating a pump provided at a hydraulic pressure circuit.

At this occasion, the brake fluid necessary for increasing the pressure stored to a reservoir tank is used, and the brake fluid stored to the reservoir tank is sucked to a pump to supply to the side of the wheel brake (e.g., Patent References 1 and 2; Patent Reference 2: JP-A-8-324406).

Meanwhile, in a vehicle of a bar handle type such as an automatic two wheel vehicle, an automatic three wheel vehicle, an all terrain vehicle (ATV), from a viewpoint of an installing space of the vehicle, a reservoir tank is attached to a bar handle, however, when such a mode is adopted, there is a concern of complicating attachment of a pipe. Therefore, it is desired to separately provide a reservoir tank capable of storing the brake fluid.

Hence, it is conceivable to provide the reservoir tank to a modulator (base member) or the like constituting a vehicle brake hydraulic pressure controller. However, the base member is provided with pluralities of flow paths and member mounting holes for carrying out a brake hydraulic pressure control, when the reservoir tank is going to be provided by avoiding the flow paths and the member mounting holes, there poses a problem that the base member itself becomes large-sized.

SUMMARY OF THE INVENTION

Hence, it is an object of the invention to provide a vehicle brake hydraulic pressure controller that can settle each of members well and be downsized.

Further, it is an object of the invention to provide a low pressure accumulator used in a vehicle brake hydraulic pressure controller and contributing to small-sized formation of the apparatus.

In order to achieve the object, according to a first aspect of the present invention, a vehicle brake hydraulic pressure controller including a brake system that brakes a wheel brake and a stroke simulator including a dummy cylinder that exerts an operation reaction force in accordance with an operation state of a brake operation element, the vehicle brake hydraulic pressure controller comprises:

a base member constituted with a flow path in correspondence with the brake system;

a plurality of electromagnetic valves attached to a one face of the base member, the electromagnetic valves controlling a flow of a brake fluid in the flow path;

a motor attached to an other face constituting a back face side of the one face of the base member; and a pump attached to a side face contiguous to the one face of the base member, the pump being driven by the motor and delivering the brake fluid to the flow path;

wherein the dummy cylinder of the stroke simulator and the pump are aligned at the base member with axis lines thereof in a longitudinal direction being substantially in parallel with each other.

According to the vehicle brake hydraulic pressure controller, the dummy cylinder needing a large volume to achieve a predetermined operation reaction force in the stroke simulator and the pump similarly needing a comparatively large containing space in the base member are aligned at the base member by making the axis lines in the longitudinal direction being substantially in parallel with each other, and therefore, members occupying large spaces in the base member are settled well, space save formation is achieved, which contributes to preventing the apparatus from being large-sized.

According to a second aspect of the present invention as set forth in the first aspect of the present invention, it may be adapted that the vehicle brake hydraulic pressure controller includes an output hydraulic pressure path communicated to a side of the wheel brake from a master cylinder as the flow path, the vehicle brake hydraulic pressure controller further comprising:

a shut-off valve which shuts off the output hydraulic pressure path in an operation state of the pump;

a reservoir provided at the flow path, the reservoir storing the brake fluid; and a pressurizing member which applies a pressure to a hydraulic pressure path communicated at least with the wheel brake by a stroke of a pressurizing piston, said stroke being activated by receiving a brake hydraulic pressure that is generated on a side of the master cylinder by operating the brake operation element, wherein the reservoir and the pressurizing member are mounted to the base member from an other face of a front face and a rear face of the base member.

According to the vehicle brake hydraulic pressure controller, the base member is provided with the constitution in which the output hydraulic pressure path communicated with the side of the wheel brake from the master cylinder is shut off by the shut-off valve in operating the pump, in members mounted to the base member, the reservoir and the pressurizing member needing comparatively large containing spaces are mounted to the base member from the other face of the front face and the rear face of the base member, and therefore, the space provided by that amount can be utilized for forming the flow path for arranging other member, and small-sized formation of the apparatus can be achieved.

According to a third aspect of the present invention as set forth in the second aspect of the present invention, it may be adapted that a low pressure accumulator containing the brake fluid is provided on back face sides of a regulator and the pressurizing member provided at the flow path; and the low pressure accumulator is arranged at a lower portion of the base member.

According to the vehicle brake hydraulic pressure controller, the low pressure accumulator for containing the brake fluid is provided on the back pressure sides of the regulator and the pressurizing member provided at the flow path, and therefore, the brake fluid on the back pressure sides can be stored to the low pressure accumulator. Further, the low pressure accumulator is provided at the lower portion of the base member, and therefore, in view of layout, a space for storing the brake fluid is easy to be ensured, and therefore, a volume of the low pressure accumulator is easy to be set.

According to a fourth aspect of the present invention as set forth in the second aspect of the present invention, it may be adapted that the stroke simulator is arranged at an upper position of the motor; the pressurizing member and the reservoir are arranged at a lower position of the motor; and the base member accommodates the stroke simulator, the pressurizing member and the reservoir and shows a channel-like shape in a side view thereof.

According to the vehicle brake hydraulic pressure controller, respective members can be arranged by effectively utilizing spaces on an upper side and a lower side of the motor. That is, wasteful spaces are not formed on the upper side and the lower side of the motor, an efficient part arrangement can be realized to enable further small-sized formation.

According to a fifth aspect of the present invention as set forth in the third aspect of the present invention, it may be adapted that the pressurizing piston is provided at inside of a bottomed recess shape housing; and the low pressure accumulators are provided on a side of a bottom portion of the pressurizing member and a side of a bottom portion of the reservoir.

According to the vehicle brake hydraulic pressure controller, the low pressure accumulators are provided on the side of the bottom portion of the pressurizing member and on the side of the bottom portion of the reservoir, and therefore, an efficient part arrangement can be realized by preventing interference among parts at the lower portion of the base member. Therefore, a function of storing the brake fluid can be promoted by increasing volumes of the members.

According to a sixth aspect of the present invention as set forth in the third aspect of the present invention, it may be adapted that the low pressure accumulator comprises:

an accumulator chamber in a bottomed recess shape;

a diaphragm portion provided at inside of the accumulator chamber, the diaphragm portion partitioning the accumulator chamber to a brake fluid chamber that stores the brake fluid and an atmosphere chamber to which an atmospheric pressure is introduced, being moved by following an increase or a decrease of the brake fluid stored to the brake fluid chamber, and changing a volume of the brake fluid chamber;

a lid member provided at the atmosphere chamber of the accumulator chamber and formed with an atmosphere communicating hole; and a restricting member provided at the brake fluid chamber, which restricts the diaphragm portion from being moved by being brought into contact with the diaphragm portion moved by following the decrease in the brake fluid.

According to the low pressure accumulator, inside of the accumulator chamber is provided with the diaphragm portion moved by following the increase or the decrease of the brake fluid stored to the brake fluid chamber for changing the volume of the brake fluid chamber, and therefore, when the brake fluid flows in to the brake fluid chamber, the diaphragm portion is deformed by following the flow and the brake fluid is received. Further, when the brake fluid flows out from the brake fluid chamber, the diaphragm portion is deformed by following the flow out and the brake fluid is permitted to flow out.

Therefore, flow in and flow out of the brake fluid can be dealt with without needing a stroke structure of a piston present in a reservoir tank of the background art to be able to contribute to compact formation of the apparatus.

Further, the brake fluid chamber is provided with the restricting member for restricting the diaphragm portion from being moved by being brought into contact with the diaphragm portion, and therefore, it is prevented that the diaphragm portion is moved (deformed) more than necessary in accordance with flow in and flow out of the brake fluid to provide the low pressure accumulator promoting durability.

According to a seventh aspect of the present invention as set forth in the sixth aspect of the present invention, it may be adapted that the diaphragm portion includes a peripheral edge portion brought into close contact with the inner wall portion of the accumulator chamber; and the lid member includes a pressing portion that presses the peripheral edge portion of the diaphragm portion toward the inner wall portion of the accumulator chamber to be brought into close contact therewith.

According to the low pressure accumulator, the peripheral edge portion of the diaphragm portion achieves a seal function, and therefore, fluid tightness of the brake fluid chamber and the atmosphere chamber partitioned by the diaphragm portion is ensured. Further, when the lid member is integrated to the accumulator chamber, by attaching the lid member to the inner wall portion such that the peripheral edge portion of the diaphragm portion is interposed between the pressing portion of the lid member and the inner wall portion of the accumulator chamber when the lid member is integrated to the accumulator chamber, the lid member can simultaneously be attached to the accumulator. Therefore, it is not necessary to use other member for fixing the diaphragm portion and a reduction in a number of parts can be achieved. Further, also a time period required for integrating the diaphragm portion can be shortened.

According to an eighth aspect of the present invention as set forth in the sixth aspect of the present intention, it may be adapted that the accumulator chamber includes two of the diaphragm portions and two of the lid members; by arranging the two diaphragm portions in an axis line direction of the accumulator chamber centering on the restricting member so as to be spaced apart from each other by an interval therebetween, the two brake fluid chambers are provided on both sides of the restricting member; and the lid members are provided at two of the atmosphere chambers formed at the accumulator chamber by the two diaphragm portions.

According to the low pressure accumulator, the two brake chambers are provided on the both sides of the restricting member, and therefore, more of the brake fluid can be stored. Thereby, in a limited space of the base member in the vehicle brake hydraulic pressure controller, a number of holes necessary for the accumulator chamber can be reduced, and the small-sized formation of a total of the apparatus can be achieved.

According to a ninth aspect of the present invention as set forth in the eighth aspect of the present invention, it may be adapted that the restricting member is provided with a communicating hole that enables the brake fluid to flow between the two brake fluid chambers.

According to the low pressure accumulator, the two diaphragm portions in the two brake fluid chambers can cooperatively be moved in flowing in and flowing out of the brake fluid, and the following performance of the two diaphragm portions can be promoted.

According to a tenth aspect of the present invention as set forth in the sixth aspect of the present invention, it may be adapted that the diaphragm portion comprises a contact portion that closes the atmosphere communicating hole, the contact portion being made of member different from the diaphragm portion and being integrally molded with the diaphragm portion.

According to the low pressure accumulator, there can be constructed a constitution of bringing the diaphragm portion into contact with the lid member and the restricting member by way of the contact portion, and durability of the diaphragm portion moved by following the increase or the decrease of the brake portion can be promoted.

According to an eleventh aspect of the present invention as set forth in the sixth aspect of the present invention, it may be adapted that the brake system can apply a brake hydraulic pressure to the wheel brake in a state of shutting off the flow path; and the brake fluid chamber is provided with a volume capable of storing a brake fluid amount necessary for pressing the wheel brake in a state of shutting off the flow path.

According to the low pressure accumulator, even in a state of shutting off the flow path connecting the side of the master cylinder and the side of the wheel brake (bi-wire control time), the brake control of the wheel brake by the pump can preferably be carried out without communicating the side of the master cylinder and the side of the wheel brake.

According to the vehicle brake hydraulic pressure controller according to the invention, small-sized formation of the apparatus can be achieved despite the constitution including the dummy cylinder of the stroke simulator needing the volume.

DESCRIPTION OF PREFERRED EMBODIMENTS

The best mode for carrying out the invention will be explained in details in reference to the attached drawings as follows. Further, in the explanation, the same symbols are used for the same elements and a duplicated explanation thereof will be omitted.

Figure 1:
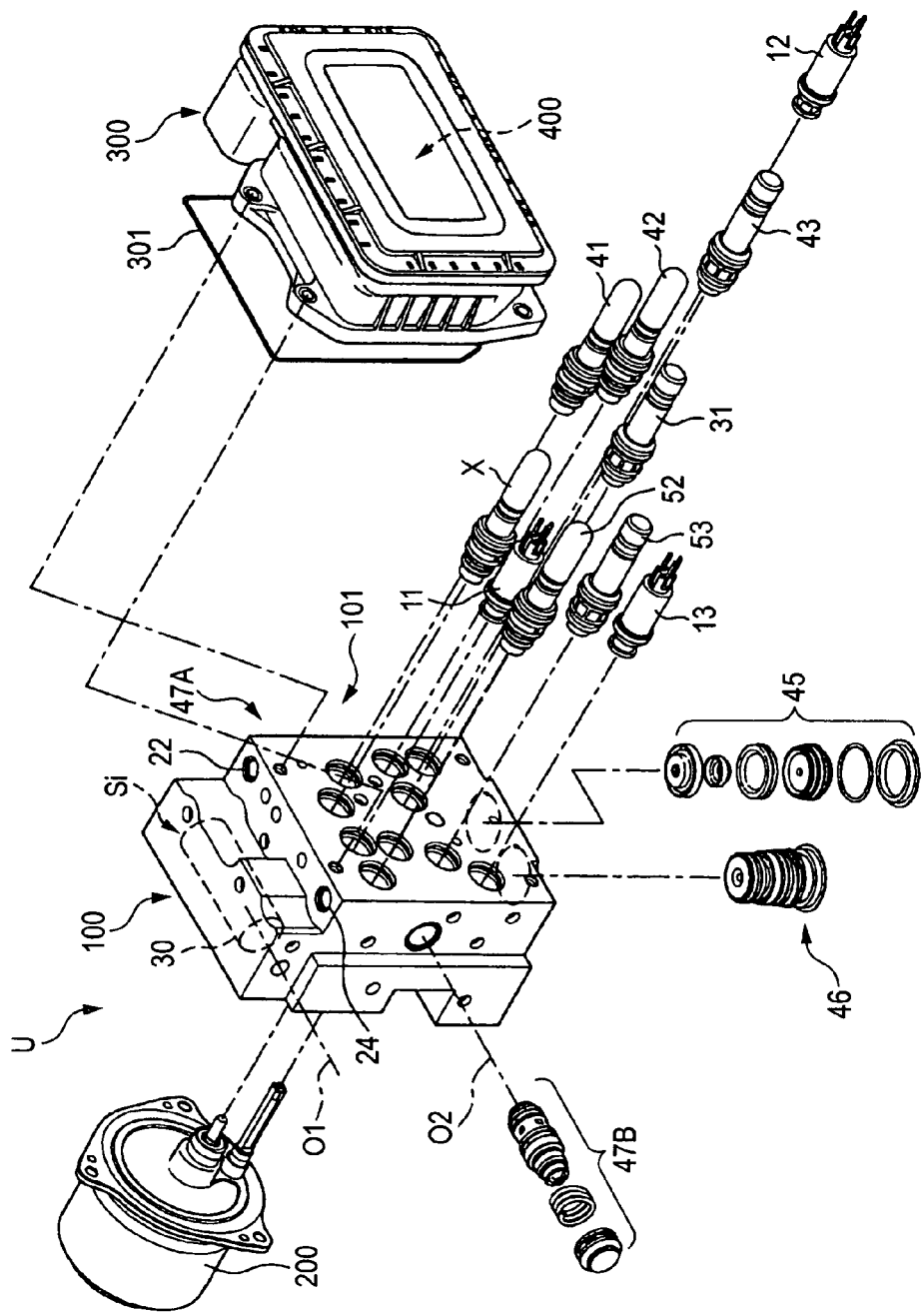
FIG. 1 is a disassembled perspective view showing a vehicle hydraulic pressure controller according to an embodiment of the invention.

FIG. 1 is a disassembled perspective view showing a vehicle brake hydraulic pressure controller to which a low pressure accumulator according to an embodiment of the invention is applied in the referred drawings.

As shown by FIG. 1, the vehicle brake hydraulic pressure controller (hereinafter, referred to as "brake hydraulic pressure controller") U to which the low pressure accumulator according to the embodiment is applied is preferably used for a vehicle of a bar-handle type of an automatic two wheel vehicle, an automatic three wheel vehicle, an all terrain vehicle (ATV) or the like, and is constituted by including a base member (pump body) 100, a motor 200 attached to a rear face of the base member 100, a control housing 300 attached to a front face of the base member 100, a controller 400 contained in the control housing 300.

Figure 21:
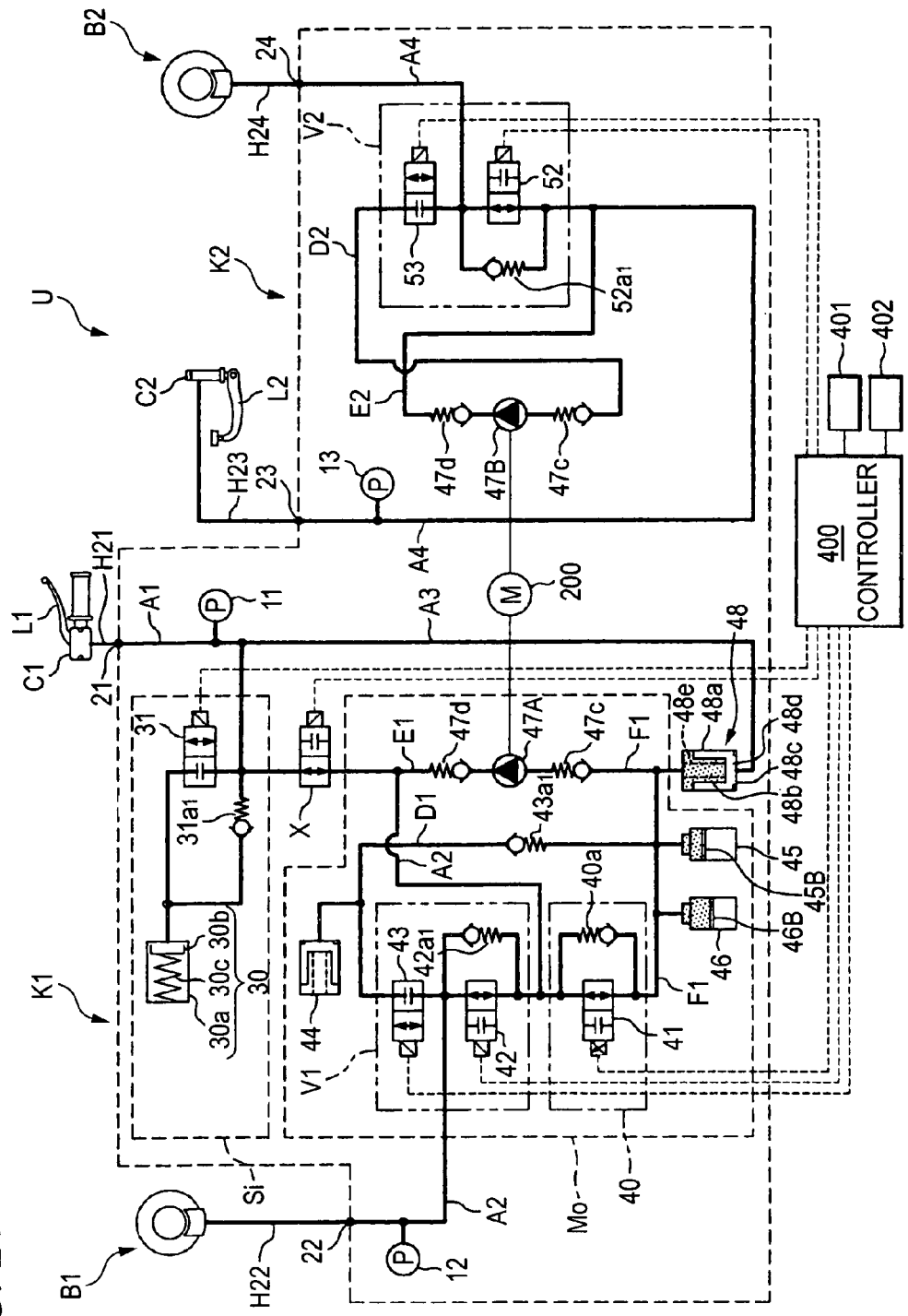
FIG. 21 is a brake hydraulic pressure circuit diagram applied to a vehicle brake hydraulic pressure controller according to an embodiment of the invention.

The brake hydraulic pressure controller U embodies a hydraulic pressure circuit shown in FIG. 21, constituted by including two brake systems K1, K2, and capable of executing independent antilock brake controls of wheel brakes B1, B2 and a interlocking brake control for interlocking two of the wheel brakes B1, B2 by pertinently controlling brake forces (brake hydraulic pressures) exerted to the wheel brake B1 mounted to a front wheel and the wheel brake B2 mounted to a rear wheel.

The brake system K1 on one side is for braking the front wheel and is a system reaching an outlet port 22 from an inlet port 21. Further, the inlet port 21 is connected with a pipe H21 reaching a master cylinder C1 constituting a hydraulic pressure source, the outlet port 22 is connected with a pipe H22 reaching the wheel brake B1 of the front wheel.

The brake system K2 on other side is for braking the rear wheel and is a system reaching an outlet port 24 from an inlet port 23. Further, the inlet port 23 is connected with a pipe H23 reaching a master cylinder C2 constituting a hydraulic pressure source separately from the master cylinder C1, the outlet port 24 is connected with a pipe H24 reaching the wheel brake B2 of the rear wheel.

Further, the master cylinders C1, C2 include cylinders, not illustrated, connected with a brake fluid tank chamber for storing the brake fluid, insides of the cylinders are integrated with rod pistons, not illustrated, for making the brake fluid flow out by being slid in axial directions of the cylinders by being operated by a brake lever L1, a brake pedal L2 constituting brake operators.

First, the brake system K1 on the front wheel side will be explained, next, the brake system K2 on the rear wheel side will be explained. The brake system K1 on the front wheel side mainly includes a shut-off valve X provided at a flow path (oil path) reaching the brake B1 from the master cylinder C1, a stroke simulator Si connected to a flow path reaching the shot-off valve from the master cylinder C1, a modulator Mo connected to a flow path reaching the wheel brake B1 from the shut-off valve X, a pressurizing member 48 provided at a flow path reaching the modulator Mo from the master cylinder C1, a first hydraulic pressure sensor 11 for detecting a brake hydraulic pressure of a flow path reaching the master cylinder C1, and a second hydraulic pressure sensor 12 for detecting a brake hydraulic pressure of a flow path reaching the wheel brake B1.

The stroke simulator Si includes a dummy cylinder 30, an opening/closing valve 31, a check valve 31$a_1$.

Further, the modulator Mo mainly includes a regulator 40, control valve means V1 (including electromagnetic valves 42, 43), a reservoir 44, a first accumulator 45, a second accumulator 46, a pump 47A.

Further, in the following explanation, a flow path reaching the shut-off valve X from the inlet port 21 is referred to as "output hydraulic pressure path A1", a flow path reaching the outlet port 22 from the shut-off valve X is referred to as "output hydraulic pressure path A2", a flow path reaching the pressuring member 48 from the inlet port 21 is refereed to as "output hydraulic pressure path A3", a flow path reaching the pump 47A from the output hydraulic pressure path A2 is referred to as "suction hydraulic pressure path F1", a flow path reaching the suction hydraulic pressure path F1 from the output hydraulic pressure path A2 is referred to as "open path D1", further, a flow path reaching the output hydraulic path A2 from the pump 47A is referred to as "delivery hydraulic pressure path E1".

Further, "upstream side" signifies a side of the master cylinder C1 (C2) or a side of the delivery hydraulic pressure path B1, "downstream side" signifies a side of the wheel brake B1 (B2).

The shut-off valve X is for switching a state of permitting the brake fluid to flow in to the output hydraulic pressure path A2 from the output hydraulic pressure path A1, that is, permitting the brake fluid to flow in from the side of the master cylinder C1 (side of stroke simulator Si) to the side of the modulator Mo and a state of shutting off the brake fluid to flow in and comprise an always open type electromagnetic valve interposed between the output hydraulic pressure path A1 and the output hydraulic pressure path A2. Further, according to the always open type electromagnetic valve constituting the shut-off valve X, and an electromagnetic coil for driving a valve member thereof is electrically connected to the controller 400 mentioned later, the electromagnetic valve is closed when the electromagnetic coil is excited based on an instruction from the controller 400, and opened when the electromagnetic coil is demagnetized. According to the embodiment, the shut-off valve X (electromagnetic valve) is set to be closed by starting driving means, (engine, motor or the like) of the vehicle. That is, the shut-off valve X shuts off the brake fluid from flowing in from the output hydraulic pressure path A1 to the output hydraulic pressure path A2 during a time period of driving the driving means of the vehicle (refer to FIG. 23). Further, the shut-off valve X is necessarily opened in a state of stopping the driving means or stopping the controller 400, and an operating force of the drive lever L1 (that is, a brake hydraulic pressure generated to the master cylinder C1) is directly connected to the wheel brake S1 (refer to FIG. 22).

The stroke simulator Si exerts the force, which is emulating an operating reaction force of the brake lever L1, to the brake lever L1 and is connected to the output hydraulic pressure path A1 communicating with the master cylinder C1 according to the embodiment.

The dummy cylinder 30 temporarily stores the brake fluid delivered to the output hydraulic pressure path A1 by being caused by operating the brake lever L1 and generates the operation reaction force of the brake lever L1 and includes a cylinder main body 30*a*, a piston 30*b* slidably inserted to inside of the cylinder main body 30*a*, and an urge member 30*c* for urging the piston 30*b*.

Figure 23:
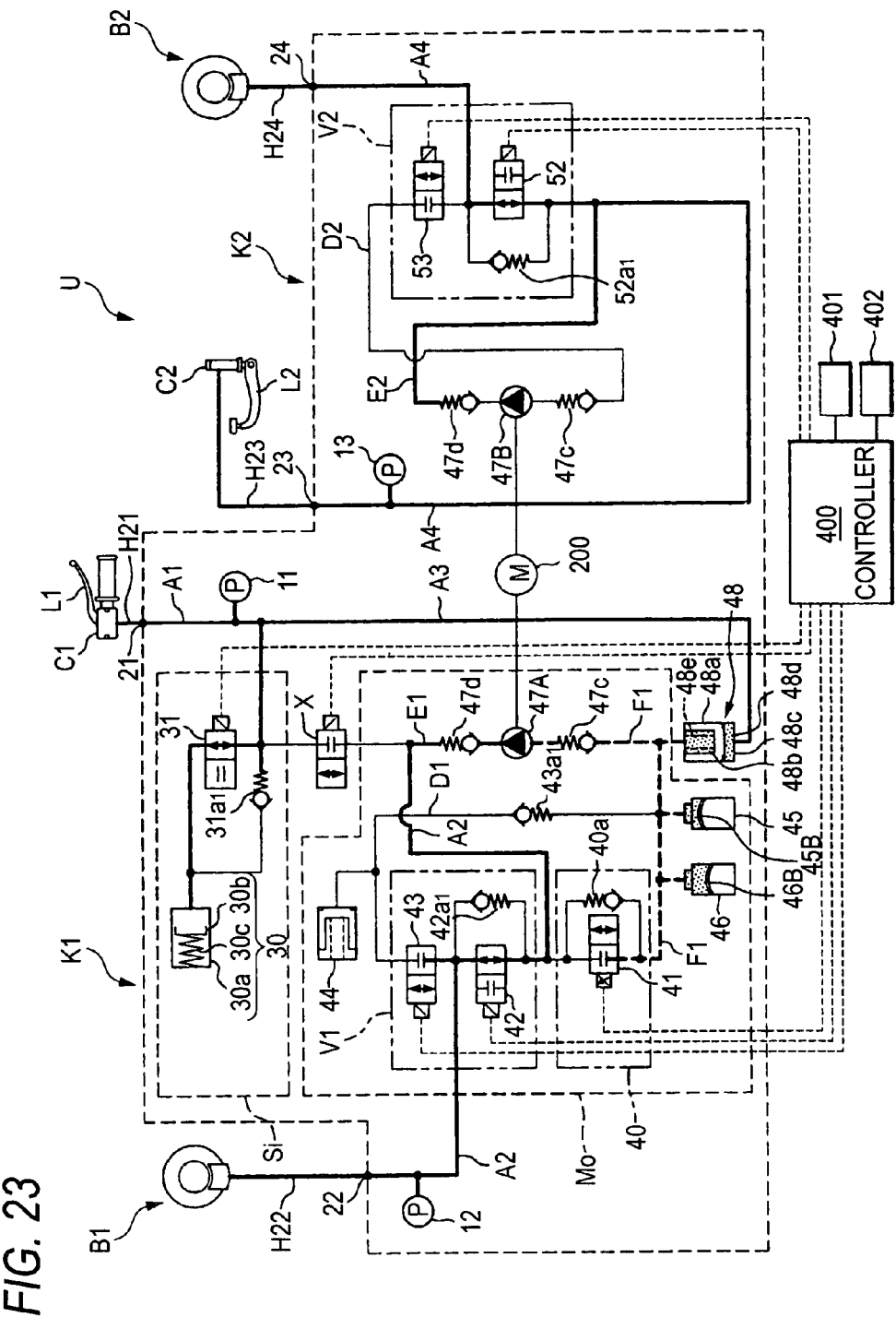
FIG. 23 is a brake hydraulic pressure circuit diagram similarly showing states in normal brake control time and in pressure increasing control time in an antilock brake control.

The opening/closing valve 31 comprises an always closed type electromagnetic valve provided at a flow path for communicating the dummy cylinder 30 and the output hydraulic pressure path A1, and is opened when the shut-off valve X shuts off the brake fluid from flowing in from the output hydraulic pressure path A1 to the output hydraulic pressure path A2 (in operating the pump 47A) to permit the brake fluid to flow in from the output hydraulic pressure path A1 to the dummy cylinder 30 (refer to FIG. 23). According to the embodiment, the opening/closing valve 31 is set to be opened by starting the driving means of the vehicle.

The check valve 31$a_1$ comprises a one way valve connected in parallel with the opening/closing valve 31 for permitting the brake fluid only to flow out from the dummy cylinder 30 to the output hydraulic pressure path A1.

The modulator Mo is for adjusting a magnitude of the brake hydraulic pressure operated to the wheel brake B1.

The regulator 40 is provided with a function of switching a state of permitting the brake fluid to flow in from the output hydraulic pressure path A2 to the suction hydraulic pressure path F1 and a state of shutting off the brake fluid and a function for adjusting the brake hydraulic pressures of the output hydraulic pressure path A2 and the delivery hydraulic pressure path E1 when the brake fluid is shut off from flowing in from the output hydraulic pressure A2 to the suction hydraulic pressure path F1 and is constituted by including a cut valve 41 and a chuck valve 40a.

The cut valve 41 is an always open type linear solenoid valve interposed between the output hydraulic pressure path A2 and the suction hydraulic pressure path A1 for switching a state of permitting the brake fluid to flow in from the output hydraulic path A2 to the suction hydraulic pressure path F1 and a state of shutting off the brake fluid. That is, the cut valve 41 is constructed by a constitution capable of adjusting a valve opening pressure by controlling to conduct electricity to the solenoid. The cut valve 41 permits the brake fluid delivered from the pump 47A to the delivery hydraulic pressure path E1 to flow in to the output hydraulic pressure path A2 to return to the suction hydraulic pressure F1 (circulate) by being opened in ordinary time. Further, when the brake lever L1 is operated, in other words, when the brake hydraulic pressure is operated to the wheel brake B1, the cut valve 41 is closed by control of the controller 400 and can adjust to open the brake pressure of the output hydraulic pressure path A2 pertinently to the suction hydraulic pressure path F1 by a balance between the brake hydraulic pressure applied from the output hydraulic pressure path A2 to the regulator 40 and a force of closing the valve by being controlled by conducting electricity to the solenoid.

The check valve 40a is connected in parallel with the cut valve 41. The check valve 40a is a one way valve for permitting the brake fluid to flow from the suction oil pressure path F1 to the output hydraulic pressure path A2.

The control valve means D1 is provided with a function of switching a state of shutting off the open path D1 while opening the output hydraulic pressure path A2, a state of opening the open path D1 while shutting off the output hydraulic pressure path A2 and a state of shutting off the output hydraulic path A2 and the open path D1 and is constituted by including an inlet valve 42, a check valve $42a_1$ and an outlet valve 43.

The inlet valve 42 comprises an always open type electromagnetic valve for permitting the brake fluid flow in from an upstream side to a downstream side when brought into a valve opening state and shuts off the brake fluid when brought into a valve closing state.

The check valve $42a_1$ is a valve for permitting the brake fluid only flow in from a downstream side to an upstream side thereof and is connected in parallel with the inlet valve 42.

An outlet valve 43 comprises an always closed type electromagnetic valve interposed between the output hydraulic path A2 and the open path D1 for shutting off the brake fluid from flowing in from the side of the wheel brake B1 to the side of the reservoir 44 when brought into a closed state and permitting the brake fluid from flowing in when brought into an opened state.

The reservoir 44 is provided at the open path D1, and is provided with a function of temporarily storing the brake fluid escaped by opening the outlet valve 43. Further, the open path D1 is provided with a check valve $43a_1$.

The first accumulator 45 and the second accumulator 46 are low pressure accumulators provided at the suction hydraulic pressure path F1 for storing the brake fluid returned to the suction hydraulic pressure path F1 in stopping the pump 47A or by way of the opening path D1. As a structure therefor, the first, the second accumulators 45, 46 include brake fluid chambers 45B, 46B capable of storing the brake fluid by receiving flowing in of the brake fluid returned to the suction hydraulic pressure path F1. According to the embodiment, a volume of the brake fluid chamber 46B of the second accumulator 46 is made to be larger than a volume of the brake fluid chamber 45B of the first accumulator 45. In other words, an amount of the brake fluid flowing in and flowing out to and from the second accumulator 46 is constituted to be larger than an amount of the brake fluid flowing in and flowing out to and from the first accumulator 45. Further, the first, the second accumulators 45, 46 may be constituted by making the volumes of the respective brake fluid chambers 45B, 46B the same, further, also a number of pieces of installing the accumulators can pertinently be selected. The brake fluid stored to the first, the second accumulators 45, 46 is sucked out to the suction hydraulic pressure path F1 by operating the pump 47A. Specific constitutions of the first, the second accumulators 45, 46 will be described later.

The pump 47A is interposed between the suction hydraulic pressure path F1 and the delivery hydraulic pressure path E1 communicating with the output hydraulic pressure path A2, driven by a rotational force of the motor 200 and sucks the brake fluid from the suction hydraulic pressure path F1 to deliver to the delivery hydraulic pressure path E1. Further, when the cut valve 41 is brought into the closed state, the pump 47A sucks in the brake fluid stored to the first, the second accumulators 45, 46 to deliver to the delivery hydraulic pressure path E1. Thereby, a pressure state of the output hydraulic pressure path A2 decompressed by storing the brake fluid to the first, the second accumulators 45, 46 is recovered and the brake hydraulic pressure can be increased based on an operation of the brake lever L1, or an operation of the interlocking brakes to the wheel brake B1

Further, the suction side and the delivery side of the pump 47A are respectively provided with a suction valve 47c, a delivery valve 47d.

Further, the delivery hydraulic pressure path E1 of the pump 47A may be provided with a dumper and an orifice, not illustrated, and a pulsation of the brake fluid delivered from the pump 47A may be attenuated by a cooperative operation of the dumper and the orifice.

The pressurizing member 48 is constituted by including a cylinder chamber 48a, and a pressurizing piston 48d for partitioning inside of the cylinder chamber 48a into a brake fluid chamber 48b and a pressurizing chamber 48c (in FIG. 21, a state of minimizing a volume of the pressurizing member 48c is shown).

The brake hydraulic chamber 48b is communicated to a side of the suction hydraulic pressure path F1 of the pump 47A, and the brake fluid returned to the suction hydraulic pressure path F1 is made to be able to flow in to the brake hydraulic chamber 48b. Further, the pressurizing chamber 48c is communicated with the output hydraulic path A3 communicating with the master cylinder C1, and the brake fluid outputted by operating the brake lever L1 is made to flow in from the master cylinder C1 to the pressurizing chamber 48c by way of the output hydraulic path A3.

The pressurizing piston 48d is urged to a side of the pressurizing chamber 48c at inside of the cylinder chamber 48a by a spring 48e as an elastic member. Thereby, a volume of the storing chamber 48b is ensured, and the brake fluid is made to flow in at inside of the storing chamber 48b.

According to the pressurizing member 48, the brake fluid flows into the brake fluid chamber 48b to be stored, the pressurizing piston 48d makes a stroke by receiving a hydraulic pressure generated by operating the brake lever L1 on the side of the master cylinder C1, and the brake fluid of the brake fluid chamber 48b is delivered to the suction fluid pressure path F1 of the pump 47A. Thereby, a hydraulic pressure in correspondence with operation of the brake lever L1 can be applied to the suction fluid pressure path F1 of the pump 47A. Further, the hydraulic pressure applied to the suction hydraulic pressure path F1 of the pump 47A is applied to the delivery hydraulic pressure path F1 by way of the pump 47A and is applied to the wheel brake B1 by way of the output hydraulic pressure path A2 as a result.

Further, when the operation of the brake lever L1 is finished and the brake lever L1 is returned, the hydraulic pressure of the output hydraulic pressure path A3 is reduced, the pressurizing piston 48d of the pressurizing member 48 is returned to the side of the pressurizing chamber 48c by the spring 48e, thereby, the brake fluid flows in from the suction hydraulic pressure path F1 to the brake fluid chamber 48b the volume of which is expanded.

The hydraulic pressure sensor 11 is for measuring a magnitude of the brake hydraulic pressure at the master cylinder C1 and is provided to the output hydraulic pressure path A1 according to the embodiment. A value of the brake hydraulic pressure measured by the first hydraulic pressure sensor 11 is inputted to the controller 400 from time to time and the cooperative brake control or the like is carried out based on the magnitude of the brake hydraulic pressure measured by the first hydraulic pressure sensor 11.

The second hydraulic pressure sensor 12 is for measuring a magnitude of the brake hydraulic pressure operated to the wheel brake B1 and is provided at the output hydraulic pressure path A2. A value of the brake hydraulic pressure measured by the second hydraulic pressure sensor 12 is inputted to the controller 400 from time to time and the cooperative brake control or the like is carried out based on the magnitude of the brake hydraulic pressure measured by the second hydraulic pressure sensor 12.

The motor 200 is a power source common to the pump 47A present in the brake system K1 on the front wheel side and a pump 47B present in the brake system K2 on the rear wheel side, and is operated based on an instruction from the controller 400.

Next, the brake system K2 on the rear wheel side will be explained. In the following, a flow path reaching the outlet port 24 from the inlet port 23 is referred to as "output hydraulic pressure path A4", a flow path reaching the pump 47B from the output put hydraulic pressure path A4 is referred to as "open path and suction hydraulic pressure path D2", a flow path reaching the output hydraulic pressure path A4 from the pump 47B is referred to as "delivery hydraulic pressure path E2".

The brake system K2 on the rear wheel side includes control valve means V2 (including electromagnetic valves 52, 53), the pump 47B, a third hydraulic pressure sensor 13.

The third hydraulic pressure sensor 13 is a hydraulic pressure detecting sensor for detecting a brake hydraulic pressure in the output hydraulic pressure path A4.

The control valve means V2 is provided with a function of switching a state of shutting off the open path and suction hydraulic pressure path D2 while opening the output hydraulic pressure path A4, a state of opening the open path and suction hydraulic pressure path D2 while shutting off the output hydraulic pressure path A4 and a state of shutting off the output hydraulic pressure path A4 and the open path and suction hydraulic pressure path D2, and is constituted by including the inlet valve 52, a check valve $52a_1$ and the outlet valve 53.

The inlet valve 52 comprises an always open type electromagnetic valve provided at the output hydraulic pressure path A4 for permitting the brake fluid to flow in from the side of the master cylinder C2 to the side of the wheel brake B2 when brought into a valve opening state, and shuts off the brake fluid when brought into a valve closing state.

The check valve $52a_1$ is connected to a flow path provided to detour the inlet valve 52 for permitting the brake fluid to flow in only from the side of the wheel brake B2 to the side of the master cylinder C2.

The outlet valve 53 comprises an always closed type interposed between the outlet hydraulic pressure path A4 and the open path and suction hydraulic pressure path D2 for shutting off the brake fluid from flowing in from the side of the wheel brake B2 to the side of the pump 47B when brought into a valve closing state and permitting the brake fluid to flow in when brought into a valve opening state.

The pump 47B is interposed between the open path and suction hydraulic pressure path D2 and the output hydraulic pressure path A4, driven by a rotational force of the motor 200, and sucks the brake fluid from the open path and suction hydraulic pressure path D2 to deliver to the delivery hydraulic pressure path A2. Further, the pump 47B plays a role of returning the brake fluid returned by way of the open path and suction hydraulic pressure path D2 from the delivery hydraulic pressure path E2 to the master cylinder C2 by way of the output hydraulic pressure path A4.

Further, a suction side and a delivery side of the pump 47B are respectively provided with a suction valve 47c, a delivery valve 47d.

Further, the delivery hydraulic pressure path E2 of the pump 47B may be provided with a dumper and an orifice, not illustrated, and a pulsation of the brake fluid delivered from the pump 47B may be attenuated by a cooperative operation of the dumper and the orifice. Further, the open path and suction hydraulic pressure path D2 may be provided with reservoir, not illustrated.

The third hydraulic pressure sensor 13 is for measuring a magnitude of the brake hydraulic pressure at the master cylinder C2 and is provided at the output hydraulic pressure path A4 according to the embodiment. A value of the brake hydraulic pressure measured by the third hydraulic pressure sensor 13 is inputted to the controller 400 from time to time to thereby carry out a cooperative brake control or the like based on the magnitude of the brake hydraulic pressure measured by the third hydraulic pressure sensor 13.

The controller 400 controls to open/close the cut valve 41 of the regulator 40, the opening/closing valve 31, the shut-off valve X of the brake system K1 on the front wheel side, open/close the inlet valves 42, 52 and the outlet valves 43, 53 of the control valve means V1, V2 in the two systems K1, K2 as well as operation of the motor 200 based on outputs of the first hydraulic pressure sensor 11, the second hydraulic pressure sensor 12 and the third hydraulic pressure sensor 13, a wheel speed sensor 401 for the front wheel fixedly arranged opposedly to a side face of a pulser gear fixedly attached to the front wheel, not illustrated, and a wheel speed sensor 402 for the rear wheel fixedly arranged opposedly to a side face of a pulser gear fixedly attached to the rear wheel, not illustrated, and the like.

Next, an explanation will be given of the normal brake control, the antilock brake control and the interlocking brake control realized by the controller 400 in reference to the hydraulic pressure circuit of FIG. 21 through FIG. 24.

Figure 22:
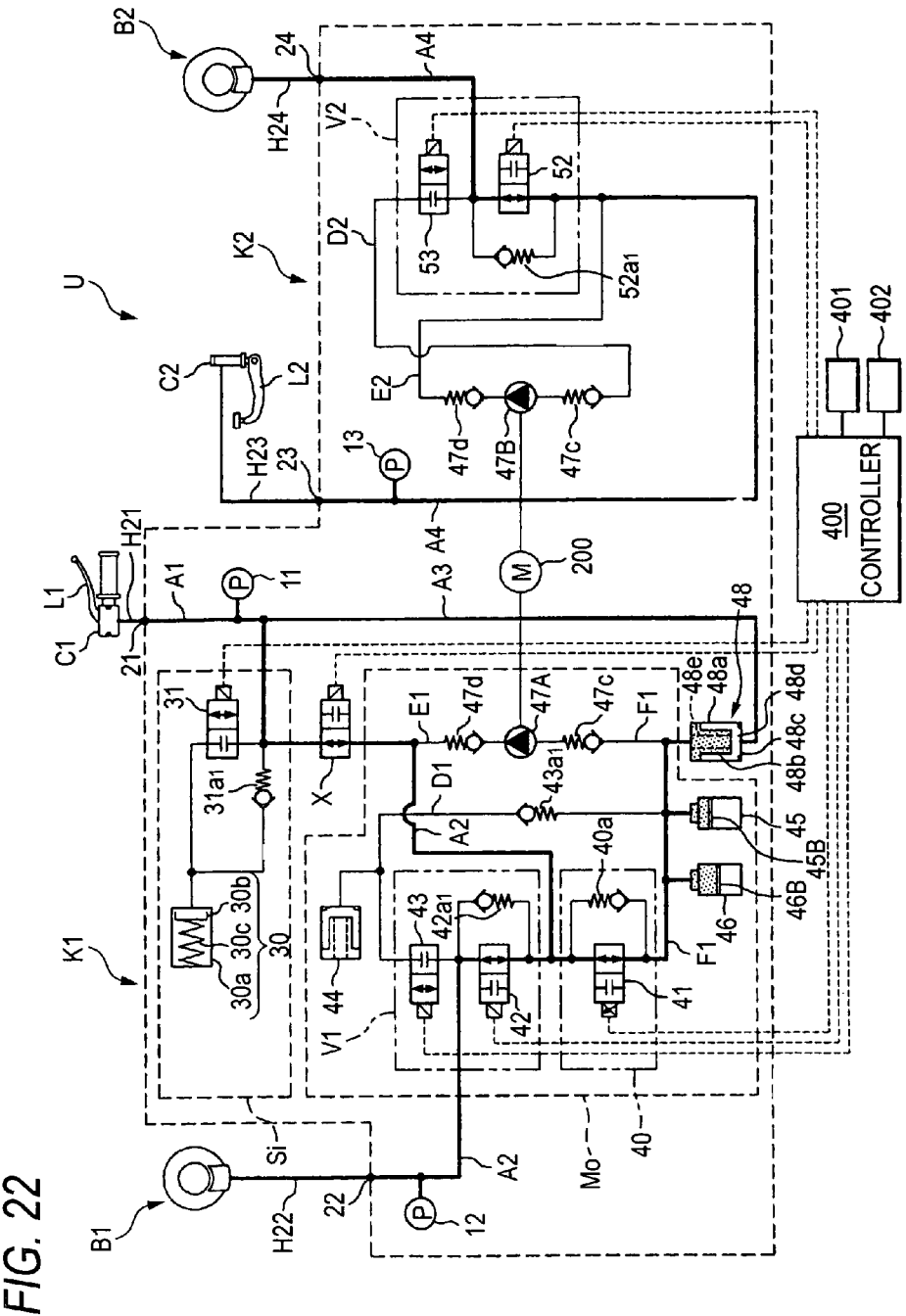
FIG. 22 is a brake hydraulic pressure circuit diagram showing a state of the vehicle brake hydraulic pressure controller in an ignition off state.

First, in an ignition off state, as shown by FIG. 22, the shut-off valve X of the brake system K1 on the front wheel side is opened to bring the output hydraulic pressure path A1 and the output hydraulic pressure path A2 into a communicated state. Further, the opening/closing valve 31 is opened to bring the output hydraulic pressure path A1 and the dummy cylinder 30 into a shut-off state. That is, there is brought about a state in which the brake hydraulic pressure by operation of the brake lever L1 is applied to the side of the modulator Mo by way of the output hydraulic path A2 to operate the wheel brake S1.

Here, although the brake hydraulic pressure by operation of the brake lever L1 is applied also to the pressurizing chamber 48c of the pressurizing member 48 by way of the output hydraulic pressure path A3, since the cut valve 41 is opened, the brake hydraulic pressure by operation of the brake lever L1 is applied also to the side of the brake fluid chamber 48b of the pressurizing member 48 from the output hydraulic pressure path A2 by way of the suction hydraulic pressure path F1 by the same pressure. Thereby, a pressure difference is not generated between the both sides of the pressurizing piston 48d and the pressurizing piston 48d does not make a stroke. Therefore, the pressurizing member 48 is maintained in a state of storing the brake fluid at the brake fluid chamber 48b, and plays a role of swiftly starting a brake force in operating the brake after ignition on, described later.

Further, in the ignition off state, when the brake lever L1 is operated, the brake fluid flows in from the output hydraulic pressure path A2 to the suction hydraulic pressure path F1, and therefore, the brake fluid can be stored to the first, the second accumulators 45, 46 connected to the suction hydraulic path F1 by the brake fluid flowing in at this occasion.

According to the brake system K2 on the rear wheel side, there is brought about a state in which the flow path is communicated from the master cylinder C2 to the wheel brake B2 by way of the output hydraulic pressure path A4, when the brake pedal L2 is operated, the brake hydraulic pressure is operated to the wheel brake B2 by way of the output hydraulic path A4.

Next, when ignition is made ON, as shown by FIG. 23, the shut-off valve X of the brake system K1 on the front wheel side is closed by the controller 400 to bring about a state of shutting off the output hydraulic pressure path A1 and the output hydraulic pressure path A2 as shown by FIG. 23. Further, the opening/closing valve 31 is opened to bring about a state of communicating the output hydraulic path A1 and the dummy cylinder 30. That is, there is brought about a state of shutting off the fluid path of the stroke simulator Si and the modulator Mo (output hydraulic pressure path A2), and there is brought about a state of operating the brake hydraulic pressure by operating the brake lever L1 is operated to the dummy cylinder 30.

On the other hand, on the side of the modulator Mo, by bringing about a state of shutting off the output hydraulic pressure path A2, there is brought about a state in which the brake pressure from the master cylinder C1 is not directly applied to the wheel brake B1. Therefore, the brake hydraulic pressure generated by being caused by the operating force of the brake lever L1 is applied to the dummy cylinder 30 as it is, simultaneously therewith, the brake hydraulic pressure is measured by the first hydraulic pressure sensor 11.

Further, when the brake lever L1 is operated, the brake hydraulic pressure generated by operating the brake lever L1 is detected by the first hydraulic pressure sensor 11, the detecting signal is inputted to the controller 400, a rotational number of the motor 200 is controlled in accordance with the large or small of the inputted brake hydraulic pressure amount, and the pumps 47A, 47B are driven. That is, in rapidly elevating the inputted brake hydraulic pressure amount, the motor 200 is controlled by the controller 400 to rotate fully, further, when the brake hydraulic pressure amount is small, the motor 200 is controlled by the controller 400 to constitute a revolution number compatible therewith.

Here, in a state in which the brake lever L1 is not operated and the brake is not inputted to the brake system K1 on the front wheel side, the inlet valve 42 is brought into a closed state.

(Normal Brake Control)

In normal brake control in which there is not a possibility of locking the respective wheels, when the driver operates the brake lever A1, the brake hydraulic pressure generated by the operating force is detected by the first hydraulic pressure sensor 11, the cut valve 41 is brought into a closed state, the inlet valve 42 is brought into the opened state, further, the pump 47A is driven. Thereby, the brake fluid present at the first, the second accumulators 45, 46 of the suction hydraulic pressure path F1 is sucked by the pump 47A to be delivered to the delivery hydraulic pressure path E1, and is sent to the wheel brake B1 by way of the output hydraulic pressure path A2. Further, the state is continued and the front wheel is braked until the pressure value measured by the second hydraulic pressure sensor 12 becomes a pressure value in correspondence with a pressure value measured by the first hydraulic pressure sensor 11.

At this occasion, based on the operation of the brake lever L1, the brake fluid flows in from the output hydraulic pressure path A3 to the pressurizing chamber 48c of the pressurizing member 48 to press the pressurizing piston 48d by the brake hydraulic pressure in accordance with an operating force of the brake lever L1.

When the pressurizing piston 48d is pressed to be moved to the side of the brake fluid chamber 48b, the brake fluid stored to the brake hydraulic chamber 48b is delivered from the brake fluid chamber 48b to the suction hydraulic path F1. The brake fluid delivered to the suction hydraulic pressure path F1 is delivered to the suction hydraulic pressure path F1 prior to delivering the brake fluid by the pump 47A as described above, and the suction side of the pump 47A and the check valve 40a of the regulator 40 are applied with the brake hydraulic pressure delivered from the pressurizing member 48.

Here, a set value of the valve opening pressure of the delivery valve 47d of the pump 47A is set to be larger than the set value of the valve opening pressure of the check valve 40a of the regulator 40, thereby, the brake hydraulic pressure is transmitted to the fluid brake B1 in an order of (1) through (3) explained below.

(1) The brake fluid delivered to the pressurizing member 48 is transmitted to the wheel brake B1 by way of the check valve 40a of the regulator 40.

(2) The brake fluid delivered from the pressurizing member 48 is transmitted to the wheel brake B1 by way of the suction valve 47c, the delivery valve 47d.

Further, finally, (3) The brake fluid delivered by driving the pump 47A is transmitted to the wheel brake B1.

Here, when a supplementary explanation is given to a relationship of (2) and (3), depending on strong or weak of the operation of the brake lever L1, there is a case in which the brake hydraulic pressure generated by the pressurizing piston 48d of the pressurizing member 48 does not reach the valve opening pressure of the delivery valve 47d of the pump 47A (a case in which the pressurizing force by the brake hydraulic pressure of the brake fluid sucked to the pump 47A is smaller than an urge force of the delivery valve 47d). In such a case, (2) and (3) are simultaneously carried out. That is, before starting delivery, the suction side of the pump 47A is brought into a precharged state.

When the brake fluid delivered from the pressurizing member 48 is transmitted to the wheel brake B1 by way of the check valve 40a of the regulator 40 or the suction valve 47c, the delivery valve 47d of the pump 47A, there is brought about a state in which the brake hydraulic pressure in accordance with the operating force of the brake lever A1 is directly operated to the wheel brake B1, thereby, a response by operating the brake lever L1 can be promoted, start of the brake force in an initial braking of the wheel brake B1 can be promoted.

Further, when the brake lever L1 is relaxed or finished to operate, the brake fluid flowing into the output fluid path A2 is returned from the open path D1 to the suction hydraulic pressure path F1 by way of the output valve 43.

(Antilock Brake Control)

The antilock brake control is carried out when the wheel is going to be brought into a locked state, and is realized by pertinently selecting states of reducing, increasing, or maintaining constant the brake hydraulic pressures operated to the wheel brakes B1, B2 by controlling the control valve means V1, V2 in correspondence with the wheel brakes B1, B2 of the wheels which are going to be brought into a locked state. Further, it is determined by the controller 400 whether any of reducing the pressure, increasing the pressure, or maintaining the pressure is selected based on the vehicle speeds provided from the vehicle speed sensor 401 of the front wheel and the vehicle speed sensor 402 of the rear wheel.

Further, when it is determined that the brake hydraulic pressure operated to the wheel brake B1 of the front wheel is to be reduced in the controller 400, the output hydraulic pressure path A2 is shut off and the open path D1 is opened by the controller 400. Specifically, the input valve 42 is excited to be brought into the valve closing state and the output valve 43 is excited to be brought into the valve opening state by the controller 400. Thereby, the brake fluid of the output hydraulic path A2 communicating with the wheel brake B1 flows in to the reservoir 44 by way of the open path D1, as a result, the brake hydraulic pressure operated to the wheel brake B1 of the front wheel is reduced. Here, the brake fluid temporarily flowing in to the reservoir 44 is returned again to the open path D1 by being sucked by the pump 47a to be recirculated to the suction hydraulic pressure path F1 to be stored to the first, the second accumulators 45, 46.

Further, when it is determined that the brake hydraulic pressure operated to the wheel brake B1 of the front wheel is to be maintained constant in the controller 400, the output hydraulic path A2 and the open path D1 are respectively shut off by the control valve means V1. Specifically, the inlet valve 42 is excited to be brought into the valve closing state, the output valve 43 is demagnetized to be brought into the valve closing state by the controller 400. Thereby, the brake fluid is confined in the flow path closed by the inlet valve 42 and the output valve 43, as a result, the brake hydraulic pressure operated to the wheel brake B1 is maintained constant.

Further, when it is determined that the brake hydraulic pressure operated to the wheel brake B1 of the front wheel is to be increased by the controller 400, the output hydraulic pressure path A2 is opened and the open path D1 is shut off by the control valve means V1. Specifically, the inlet valve 42 is demagnetized to be brought into the valve opening state, and the outlet valve 43 is demagnetized to be brought into the valve closing state by the controller 400. Thereby, the brake fluid flowing out from the delivery hydraulic pressure path E1 to the output hydraulic pressure path A2 is operated to the wheel brake B1 by way of the inlet valve 42 by operating the pump 47A to increase the brake hydraulic pressure.

Further, when the brake hydraulic pressure of the output hydraulic pressure path A2 becomes equal to or larger than a set value, the brake fluid of the output hydraulic path A2 is escaped to the suction hydraulic pressure path F1 by operating the cut valve 41, as a result, it is avoided that the excessive brake hydraulic pressure is operated to the wheel brake B1.

(Interlocking Brake Control)

The interlocking brake control is carried out in a case of operating the brake pedal L2 on the side of the rear wheel by the operator, when the brake force in accordance with the magnitude of the brake force (brake hydraulic pressure) is also operated to the wheel brake B1 on the front wheel side.

Figure 24:
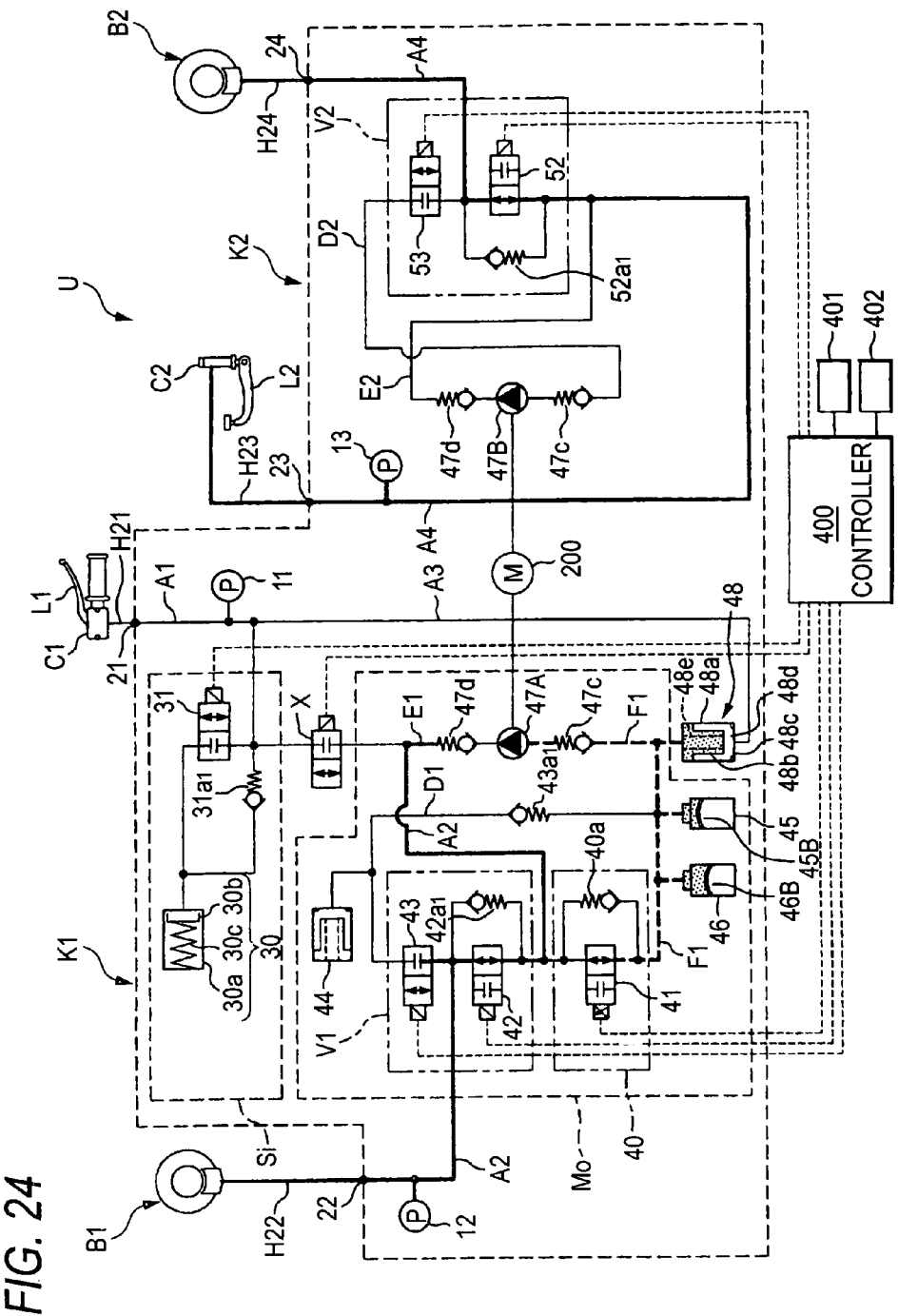
FIG. 24 is a brake hydraulic pressure circuit diagram similarly showing a state in interlocking brake control time.

For example, when the brake pedal L2 is operated by the operator to brake the rear wheel, the interlocking brake control is carried out in a case in which it is determined that it is necessary to operate the brake force also to the front wheel by the controller 400 based on various kinds of information of the operating amount of the brake pedal A2 and the magnitude of the brake hydraulic pressure measured by the third hydraulic pressure sensor 13 inputted to the controller 400. In this case, for example, as shown by FIG. 24, the controller 400 sets a target pressure value of the second hydraulic pressure sensor 12 provided in the brake system K1 on the front wheel side based on the pressure value measured by the third hydraulic pressure sensor 13 provided at the brake system K2 on the rear wheel side, further, excites the cut valve 41 in the brake system K1 on the front wheel side to be brought into the valve closing state and to bring the inlet valve 42 into the valve opening state. Further, the state is continued until the pressure value measured by the second hydraulic pressure sensor 12 reaches the target pressure value, the brake fluid present in the first, the second accumulators 45, 46 of the suction hydraulic pressure path F1 is made to flow in to the delivery hydraulic pressure path E1 by way of the pump 47A to thereby operate the brake hydraulic pressure automatically to the wheel brake B1 of the front wheel. Thereby, the front wheel is braked.

Next, a specific structure of the brake hydraulic pressure controller U will be explained in details in reference to FIG. 1 through FIG. 8.

Figure 2:
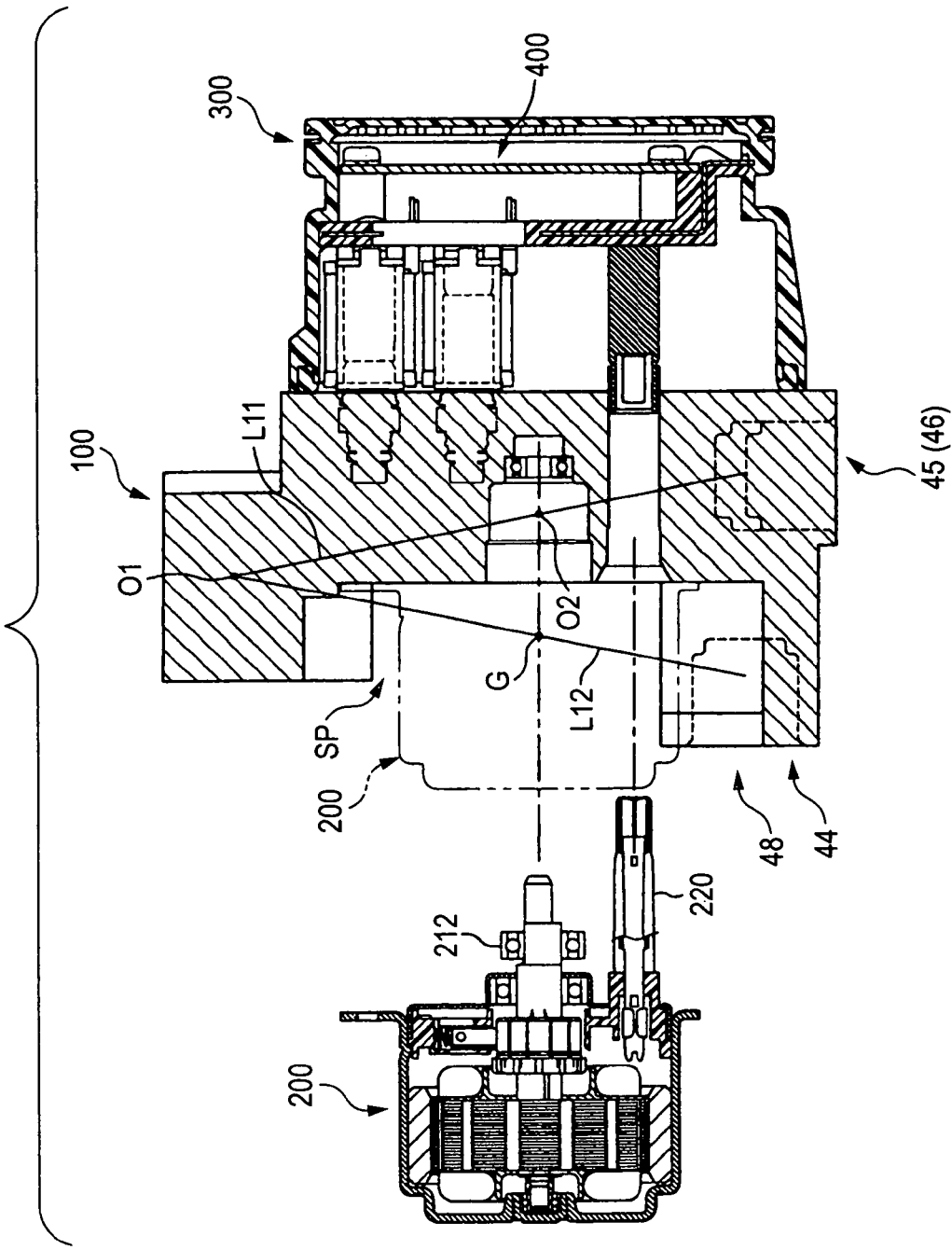
FIG. 2 is a (partially disassembled) sectional view of a brake hydraulic pressure controller.
Figure 3:
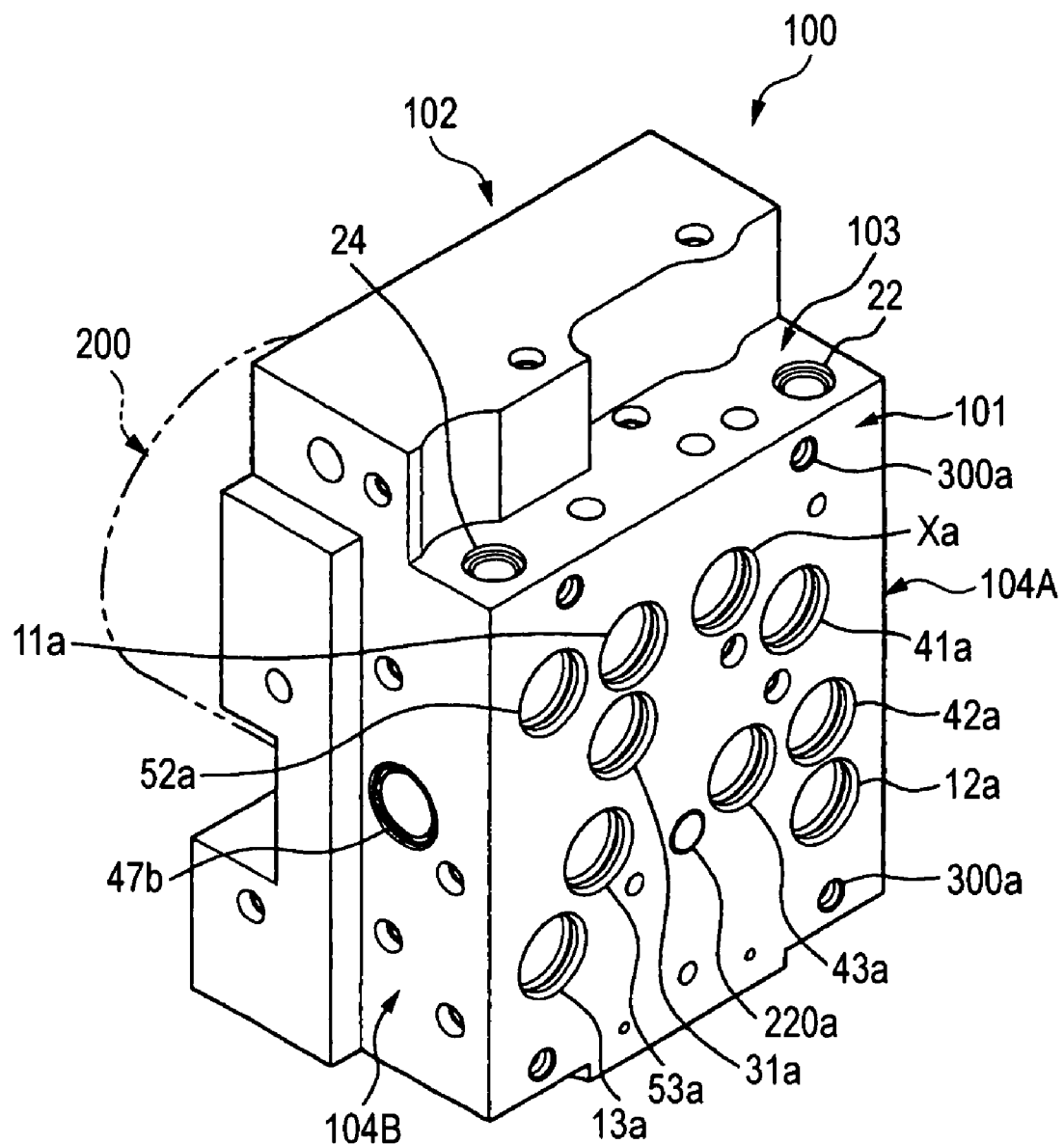
FIG. 3 is an enlarged perspective view viewing a basic member from a front face side.
Figure 4:
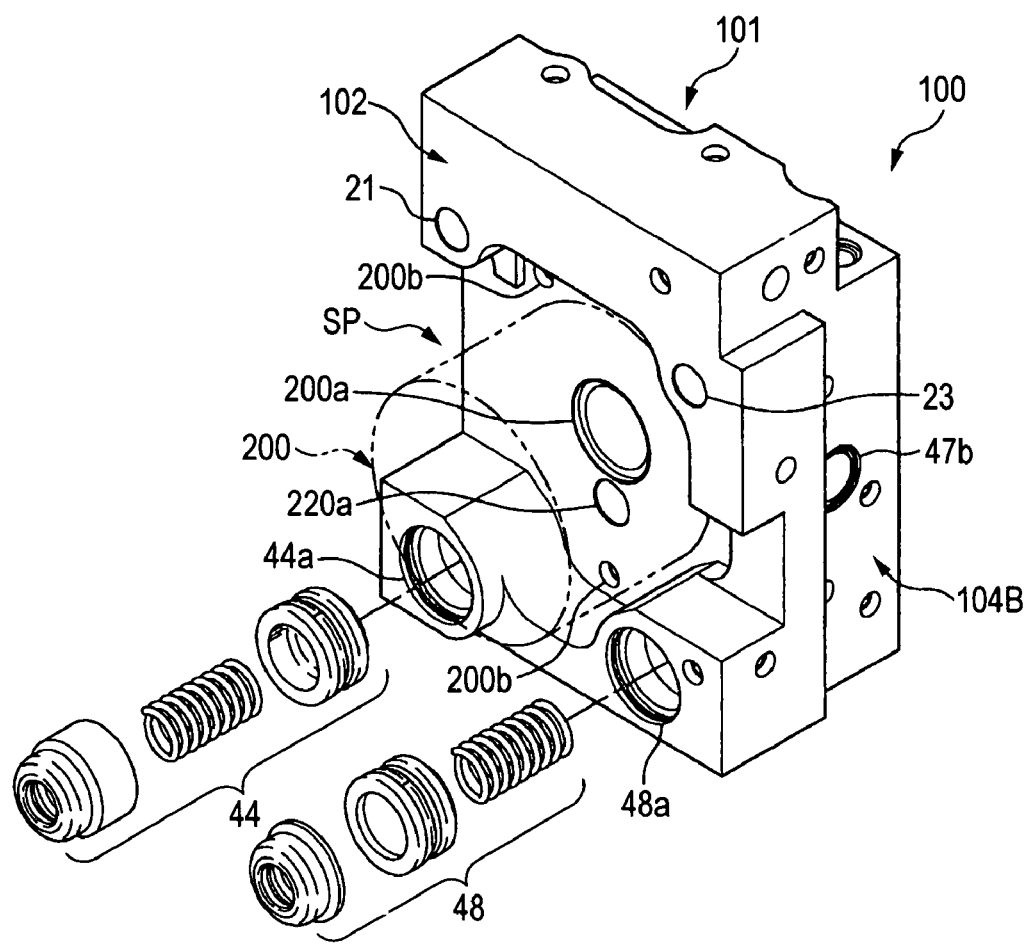
FIG. 4 is an enlarged perspective view viewing a base member from a rear face side (partially disassembled perspective view)
Figure 5:
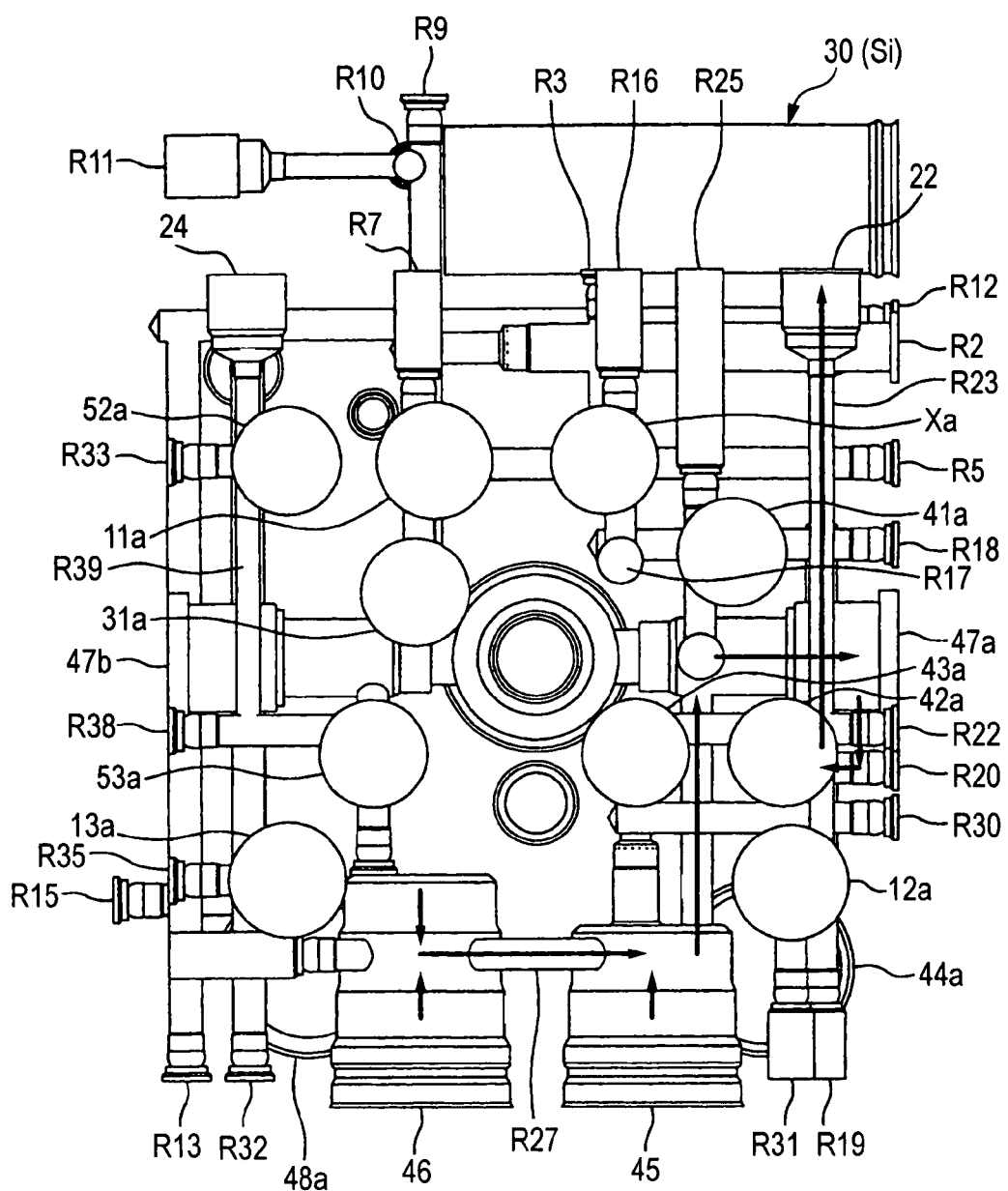
FIG. 5 is a perspective view viewing a flow path constituting portion from a front face side.
Figure 6:
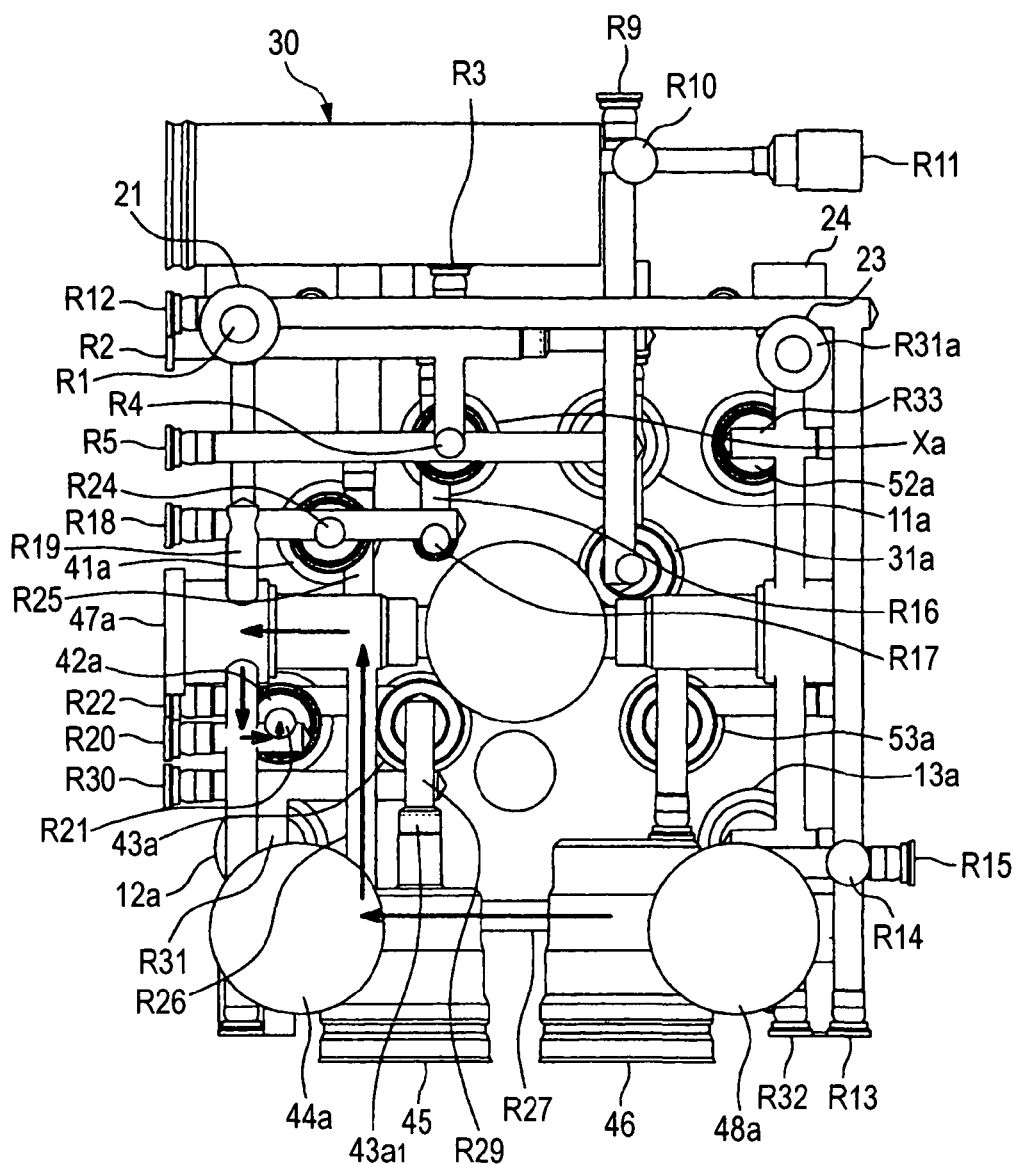
FIG. 6 is a perspective view viewing the flow path constituting portion from a rear face side.
Figure 7:
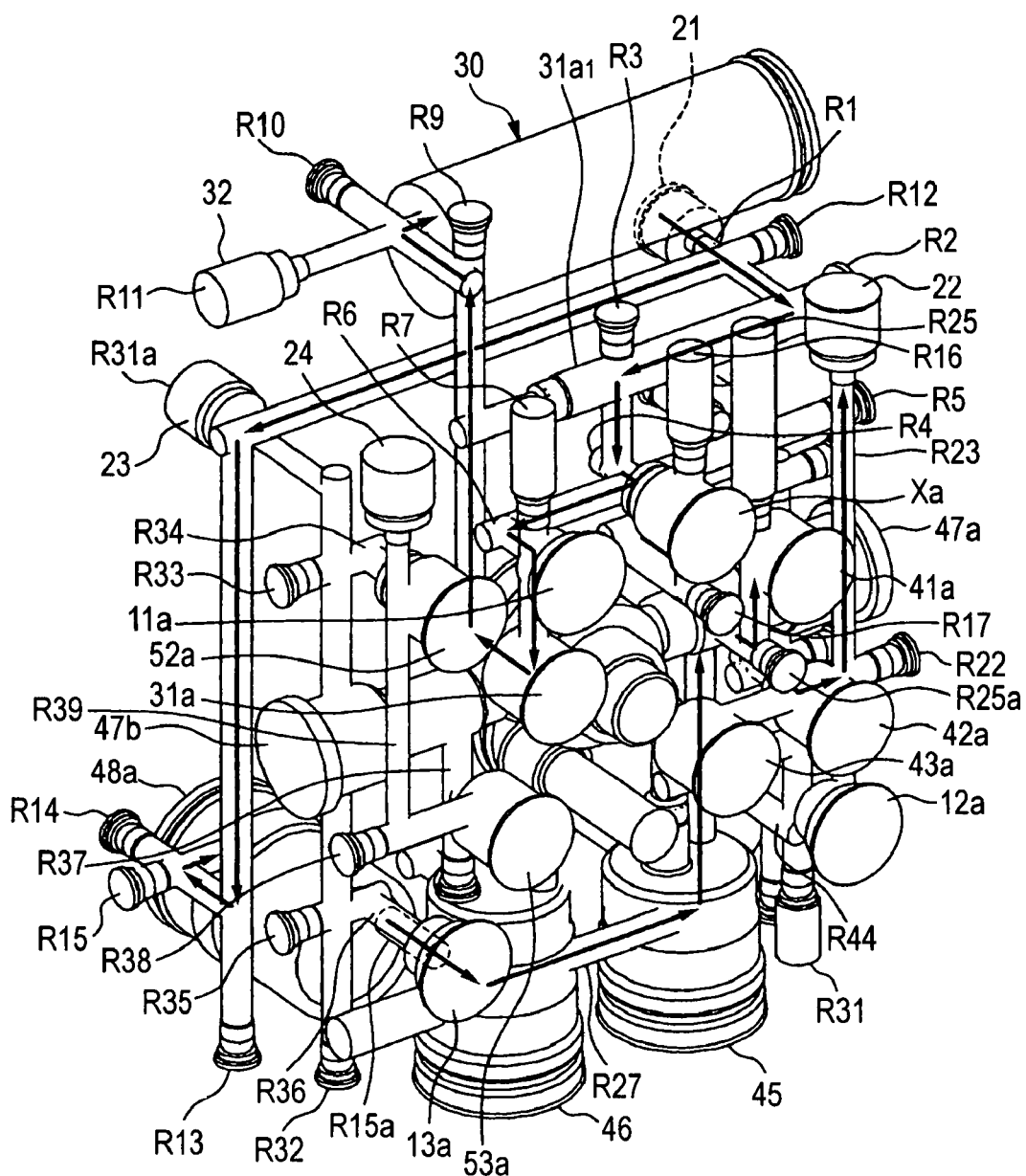
FIG. 7 is a perspective view viewing the flow path constituting portion from a skewed upper side on the front face side.
Figure 8:
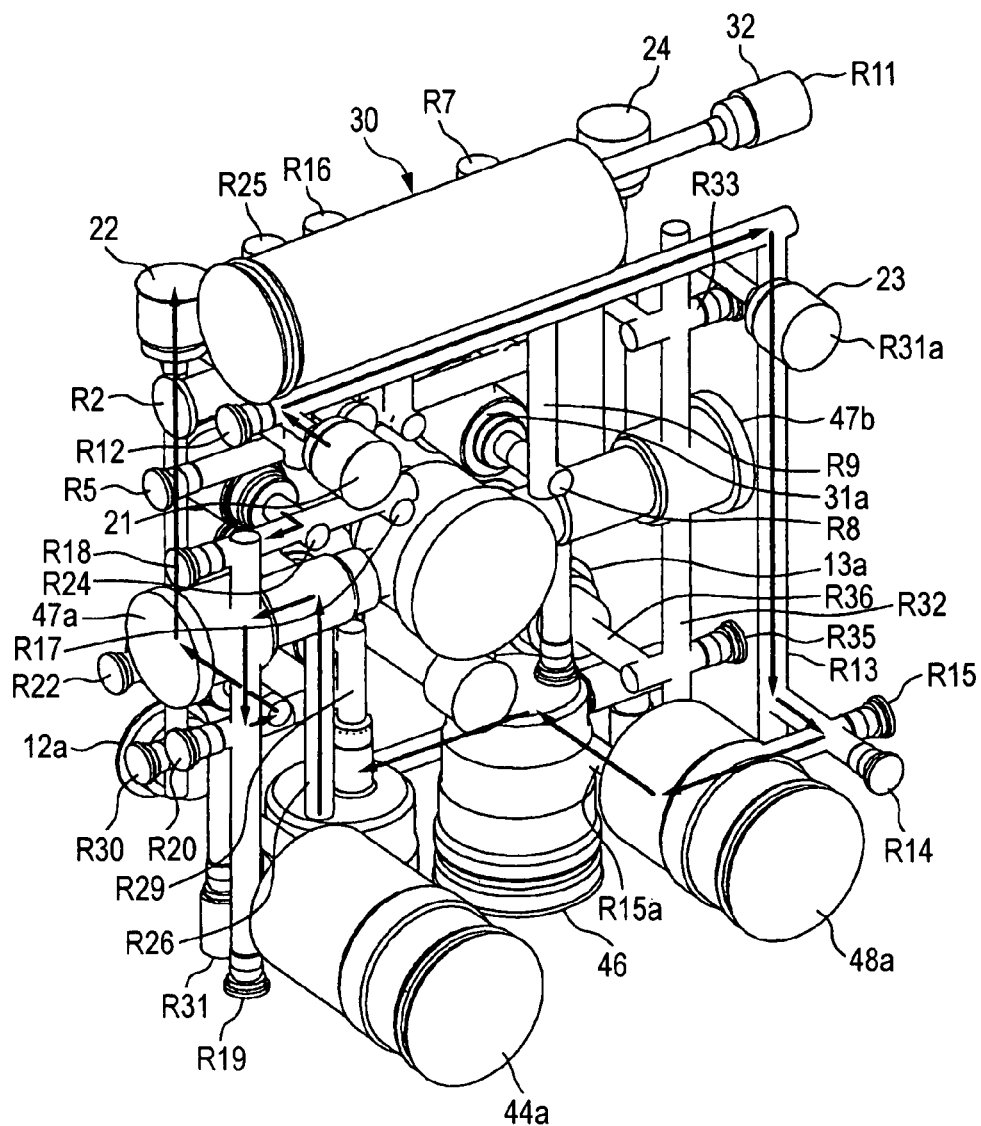
FIG. 8 is a perspective viewing the flow path constituting portion from a skewed upper side of the rear face side.

Here, FIG. 2 is a (partially disassembled) sectional view of the brake hydraulic pressure controller U, FIG. 3 is an enlarged perspective view viewing the base member 100 from a front face side, FIG. 4 is an enlarged perspective view (partially disassembled perspective view) viewing the base member 100 from the rear face side, FIG. 5 is a perspective view viewing a flow path constituting portion from the front face side, FIG. 6 is a perspective view viewing the flow path constituting portion from the rear face side, FIG. 7 is a perspective view viewing the flow path constituting portion from a skewed upper direction of the front face side, FIG. 8 is a perspective view viewing the flow path constituting portion from a skewed upper direction of the rear face side.

Here, "front/rear", "left/right", "upper/lower" in explaining the base member 100 are conveniently determined in a case of assuming "front face" by a face on a side of being attached with a side of the control housing 300 and assuming a side face by a face at which a pump hole 47b (47a) is present and are not related to a state of being attached to a vehicle, not illustrated, at all.

The base member 100 comprises a cast product, an extruded member, a drawn member or the like made of an aluminum alloy, showing substantially a channel-like shape in a side view (refer to FIG. 2). A front face side (front portion) of the base member 100 is attached with a plurality of the electromagnetic valves 31, X, 41 through 43, 52, 53, a rear face side (rear portion) is attached with the motor 200, further, left and right side portions are attached with the pump 47B, the pump 47A (in FIG. 1, only the pump 47B is illustrated, the same as follows). Further, a rear portion side of an upper portion of the base member 100 is provided with the dummy cylinder 30 constituting the stroke simulator Si, a lower portion of the base member 100 is provided with the first, the second accumulators 45, 46. Further, as shown by FIG. 4, a rear face side of the lower portion of the base member 100 is mounted with a member constituting the reservoir 44 and the pressurizing member 48 from the rear face side of the base member 100. That is, at the lower portion of the base member 100, the first, the second accumulators 45, 46 are constituted by structures of being arranged on a side of a bottom portion of the reservoir 44 and on a side of a bottom portion of the pressurizing member 48.

In this way, the base member 100 is formed with a mounting hole or the like by effectively utilizing all the faces. Further, the reservoir 44 is mounted from the rear face side of the lower portion of the base member 100, and therefore, in view of layout, a stroke of a piston of the reservoir 44 is easy to make, and therefore, a volume of the reservoir is easy to be set. Further, the apparatus of the electromagnetic valves and the like are concentrically provided on the front face side, and therefore, the attaching operation can be carried out from the front face side which is excellent in attaching operability.

Here, the motor 200 attached to the rear face side of the base member 100 is attached to a recess shape space SP of the rear portion of the base member 100 formed between the dummy cylinder 30 of the upper portion of the base member 100 and the reservoir 44 and the pressurizing member 48 of the lower portion. Thereby, the dummy cylinder 30 is disposed at an upper position of the motor 200, further, the reservoir 44 and the pressurizing member 48 are disposed at a lower position of the motor 200. That is, the dummy cylinder 30, the reservoir 44 and the pressurizing member 48 needing containing spaces wider than those of the electromagnetic valves and the like are arranged by effectively utilizing spaces formed on upper and lower sides of the motor 200.

As shown by FIG. 1, the front face 101 of the base member 100 is formed by a plane which is not substantially provided with recesses and projections, and is attached with the control housing 300 in a state of being brought into close contact therewith by way of a packing 301.

As shown by FIG. 3, the front face 101 of the base member 100 is opened with a first hydraulic sensor mounting hole 11a, a second hydraulic sensor mounting hole 12a, an opening/closing valve mounting holes 31a, a shut-off valve mounting hole Xa, a cut valve mounting hole 41a, an inlet valve mounting hole 42a, an outlet valve mounting hole 43a as mounting holes of the apparatus constituting the brake system K1 on the front wheel side (refer to FIG. 21, the same as follows). Further, the front face 101 is opened with a third hydraulic pressure sensor mounting hole 13a, an inlet valve mounting hole 52a, an outlet valve mounting hole 53a as mounting holes of the apparatus constituting the brake system K2 on the rear wheel side.

Further, the front face 101 is provided with a terminal hole 220a inserted with a terminal 220 (refer to FIG. 2) of the motor 200, four housing attaching holes 300a for attaching the control housing 300.

An upper face 103 of the base member 100 is opened with the outlet port 22 of the brake system K1 on the front wheel side, the outlet port 24 of the brake piston K2 on the rear wheel side (refer to FIG. 21), the same as follows.

Further, a left face side 104B of the base member 100 is opened with a pump hole 47b. Further, a right side face 104B of the base member 100 is opened with a pump hole 47a (refer to FIG. 5) for the pump 47A, not illustrated.

As shown by FIG. 4, the rear face 102 of the base member 100 is opened with the inlet port 21 of the brake system K1 on the front wheel side, the inlet port 23 of the brake system K2 on the rear wheel side. The recess shape space SP is opened with a rotating shaft inserting hole 200a, a terminal hole 220a, three motor attaching holes 200b (only two thereof are illustrated in FIG. 4).

Further, a lower portion of the rear face 102 is opened with a reservoir mounting hole 44a, a pressurizing member attaching hole 48a (cylinder chamber).

Next, an arrangement of the dummy cylinder 30 or the like and specific flow paths will be explained.

As shown by FIG. 5, the dummy cylinder 30 and the pumps 47A, 47B (refer to FIG. 1, the same as follows) are constituted by structures of being aligned to be provided at the base member 100 with axis lines O1, O2 (refer to FIG. 1, the same as follows) in a longitudinal direction being substantially in parallel with each other. The dummy cylinder 30 is disposed substantially at a topmost portion of a portion formed with main flow paths of the modulator Mo and the like (refer to FIG. 21), arranged by directing the axis line O1 in a left and right direction of the base member 100 (refer to FIG. 1, the same as follows) and is provided by effectively utilizing a shape of the base member 100 formed with a width widely in a left and right direction. On the other hand, the pumps 47A, 47B are arranged by directing the axis line O2 in the left and right direction of the base member 100 centering on the rotating shaft inserting hole 200a provided at a center portion.

Further, the respective pump holes 47a, 47b mounted with the pumps 47A, 47B reach side faces (refer to FIG. 4) of the base member 100 and are provided with depths containing totals of the pumps 47A, 47B. Therefore, a width dimension (dimension in left and right direction) of the base member 100 substantially becomes a size of length dimensions of the pumps 47A, 47B added with a diameter dimension of the rotating shaft inserting hole 200a.

Further, as shown by FIG. 2, the axis line O1 of the dummy cylinder 30 and the axis line O2 of the pumps 47A, 47B are shifted from each other in an up and down direction and a front and rear direction of the base member 100, in side view, the first, the second accumulators 45, 46 are disposed on an extension of a line L11 passing from the axis line O1 to the axis line O2, further, the reservoir 44, the pressurizing member 48 are disposed on an extension of a line L12 passing from the axis line O1 to substantially a gravitational center G of the motor 200. Thereby, the dummy cylinder 30, the first, the second accumulators 45, 46, the reservoir 44 and the pressurizing member 48 are arranged at respective apex positions of substantially an isosceles triangle in side view by constituting a top portion by the axis line O1 of the dummy cylinder 30. Therefore, although the base member 100 is constructed by a constitution of being formed substantially in a channel-like shape in a side view, an advantage of being excellent in a weight balance and excellent in an attaching stability to a vehicle, not illustrated, is achieved.

As shown also by FIG. 6, FIG. 8, the inlet port 21 of the brake system K1 on the front wheel side is a hole in a shape of a bottomed cylinder and is communicated with the shut-off valve mounting hole Xa by way of flow paths of a front/rear hole R1, a horizontal hole R2, a vertical hole R3 and a front/rear hole R4. The front/rear hole R4 is intersected with a horizontal hole R5, the horizontal hole R5 is communicated with the first hydraulic pressure sensor mounting hole 11a by way of a front/rear hole R6. Further, the first hydraulic pressure sensor mounting hole 11a is communicated with the opening/closing valve mounting hole 31a by way of a vertical hole R7 as shown by FIG. 8, the opening/closing valve mounting hole 31a is communicated from a front/rear hole R8 to a vertical hole R9 to rise, further, communicated with the dummy cylinder 30 by way of a flow path communicated from a front/rear hole R10 to a horizontal hole R11 as shown by FIG. 7. Further, a vertical hole R9 is communicated with a horizontal hole R2 by way of the check valve $31a_1$ inwardly provided to the horizontal hole R2. The above-described constitutes a flow path including the stroke simulator Si. Further, an end portion of the front hole R11 is formed with a breeder 32. The breeder 32 is for drawing air mixed into an oil path in enclosing the brake fluid.

On the other hand, at the inlet port 21, a horizontal hole R12 is intersected with the front/rear hole R1, the inlet port 21 is communicated with the pressurizing member mounting hole 48a by way of a flow path formed by the horizontal hole R12, a vertical hole R13, a front/rear hole R14 and a horizontal hole R15. Thereby, as shown by FIG. 6, FIG. 8, the brake fluid can be made to flow in to the pressurizing member mounting hole 48a disposed diagonally with the inlet port 21.

As shown by FIG. 6, the shut-off valve mounting hole Xa is communicated with the inlet valve mounting hole 42a by way of a flow path formed by a vertical hole R16, a front/rear hole R17, a horizontal hole R18, a vertical hole R19, the pump hole 47a, a horizontal hole R20, a front/rear hole R21. Further, as shown by FIG. 7, the inlet valve mounting hole 42a is communicated with a vertical hole R23 intersected with the vertical hole R22 from the vertical hole R22, and the vertical hole R23 is communicated with the outlet port 22 in a shape of a bottomed cylinder. Further, the vertical hole R23 is communicated also with the second hydraulic pressure sensor mounting hole 12a.

On the other hand, as shown by FIG. 6, the vertical hole R18 is communicated with the cut valve mounting hole 41a by way of the front/rear hole R24, and is communicated with the first accumulator 45 from the cut valve mounting hole 41a by way of a vertical hole R25, a front/rear hole R25a, the pump hole 47a, and a vertical hole R26. Further, the first accumulator 45 is communicated with the second accumulator 46 by way of the horizontal hole R27.

Further, the inlet valve mounting hole 42a is communicated with an outlet valve mounting hole 43a by way of a horizontal hole R22, the outlet valve mounting hole 43a is communicated with a reservoir hole mounting hole 44a by way of a flow path formed by a vertical hole R29, a horizontal hole R30 and a vertical hole R31. Further, the vertical hole R29 is communicated with the first accumulator 45 by way of a check valve $43a_1$.

Next, as shown by FIG. 5, the brake system K2 on the rear wheel side is concentrically formed on the left side of the base member 100, as shown by FIG. 7, the inlet port 23 is penetrated through an inlet valve mounting hole 52a by way of a flow path formed by a front/rear hole R31, a vertical hole R32, a horizontal hole R33 and a front/rear hole R34, and is communicated with the third hydraulic pressure sensor mounting hole 13a from a horizontal hole R35 by way of a front/rear hole R36.

Further, the pump hole 47b is communicated with the outlet valve mounting hole 53a from a vertical hole P37, the outlet valve mounting hole 53a is communicated with the outlet port 24 by way of a horizontal hole R38, a vertical hole R39. Further, the vertical hole R39 is also communicated with the inlet valve mounting hole 52a.

Figure 13:
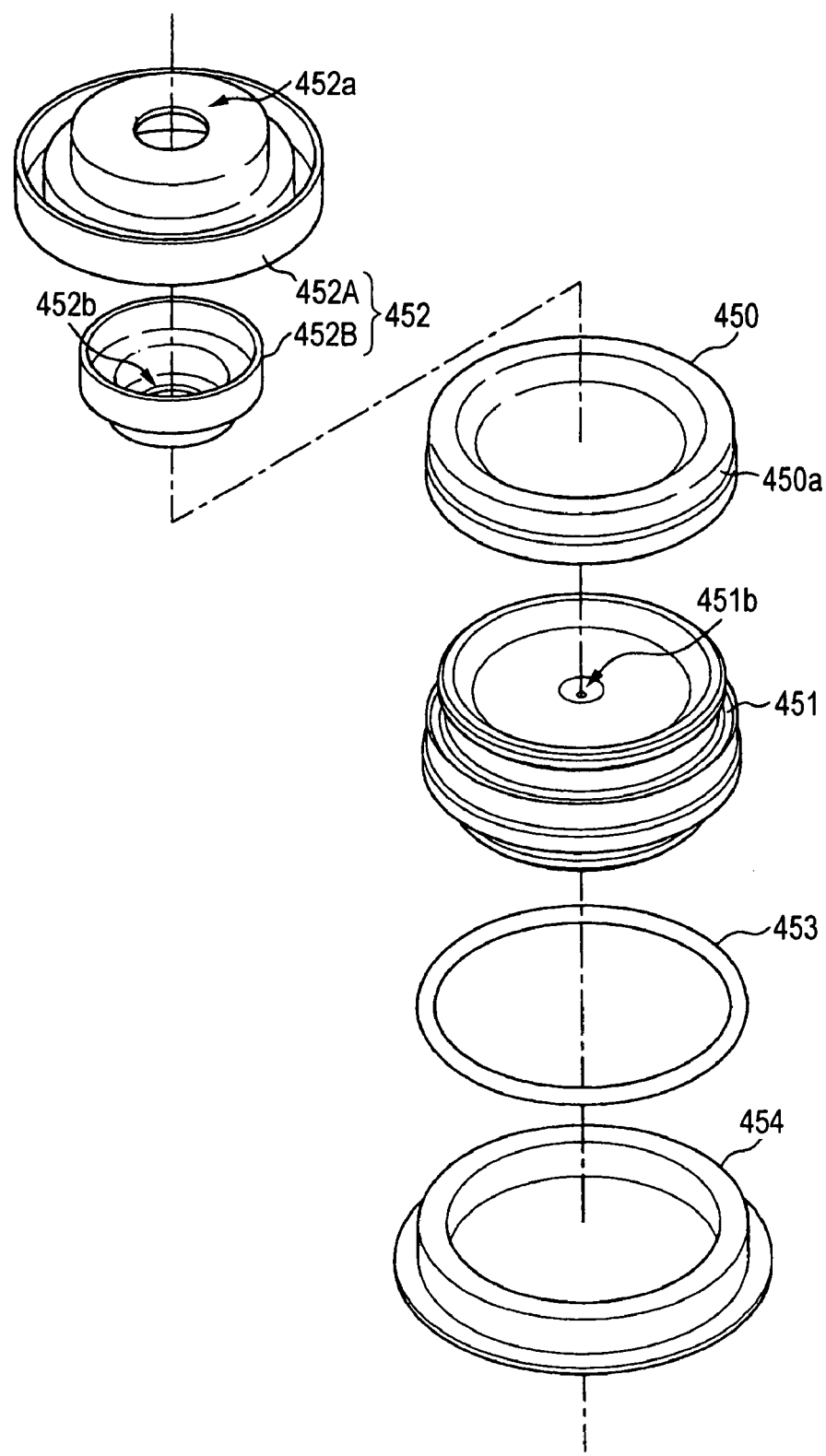
FIG. 13 is a disassembled perspective view showing members of constituting a first accumulator.
Figure 14:
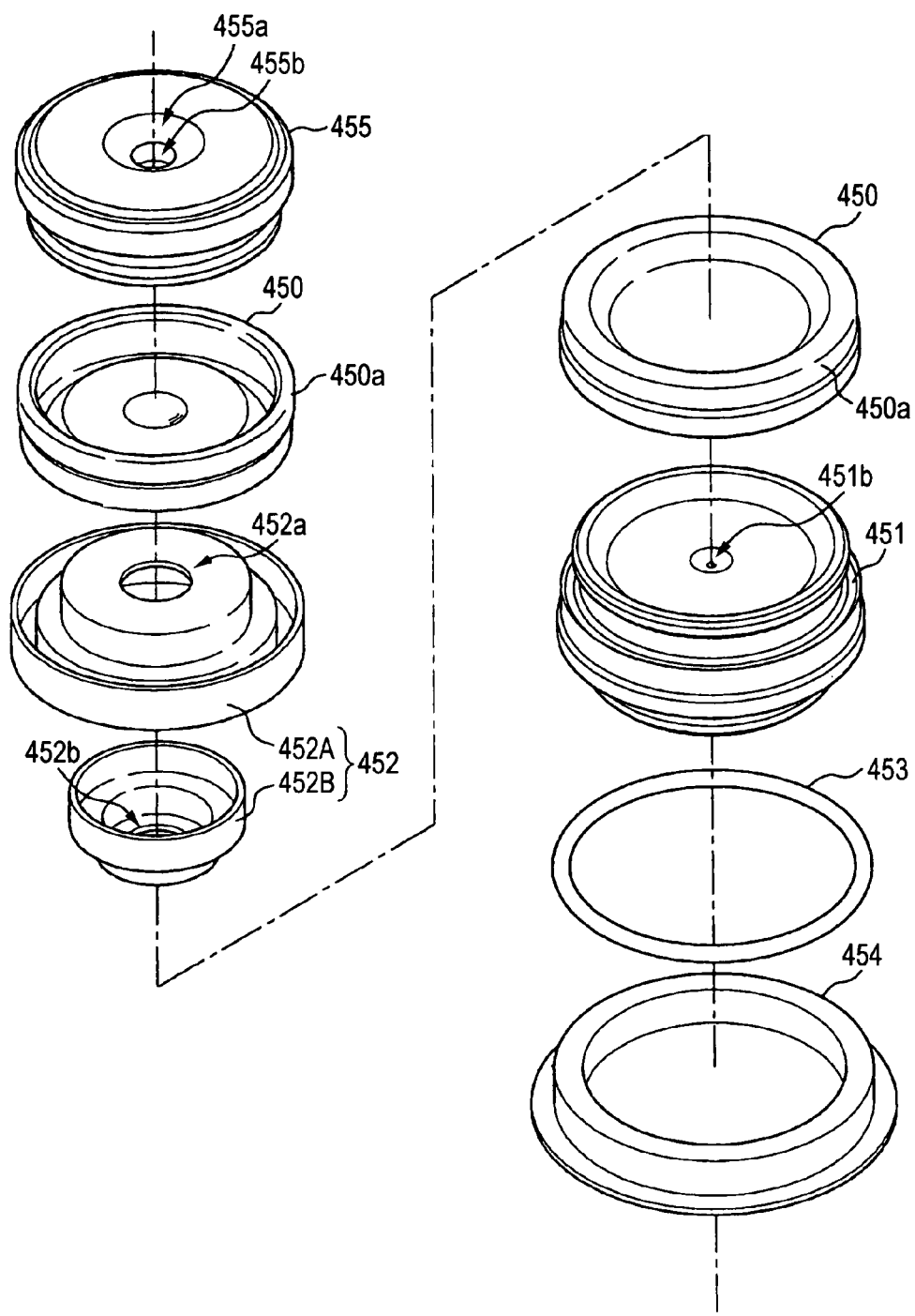
FIG. 14 is a disassembled perspective view showing members of constituting a second accumulator.

Next, constitutions of main parts will be explained. Here, FIG. 12 is a sectional view for explaining constitutions of the first, the second accumulators, FIG. 13 is a disassembled perspective view showing the constitution of the first accumulator, FIG. 14 is a disassembled perspective view showing the constitution of the second accumulator.

Figure 12:
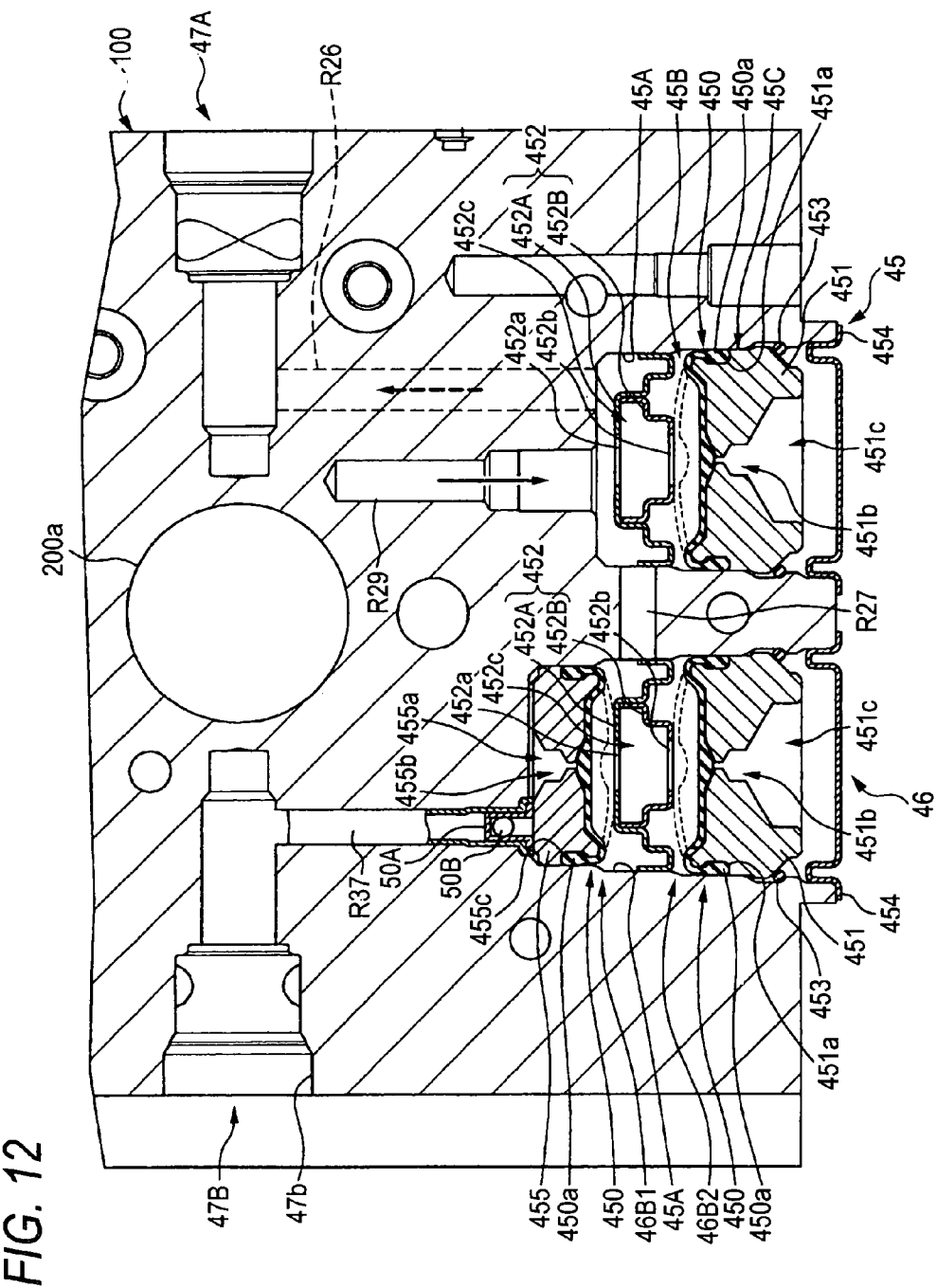
FIG. 12 is an enlarged sectional view showing a low pressure accumulator.

As shown by FIG. 12 (pertinently refer to FIG. 13, FIG. 14), the first accumulator 45 and the second accumulator 46 are low pressure accumulators provided at a lower portion of the base member 100 and provided at the suction hydraulic pressure path F1 of the pump 47A (refer to FIG. 21).

The first accumulator 45 is constituted by attaching a diaphragm portion 450, a lid member 451, a restricting member 452 to an accumulator chamber 45A in a shape of a bottomed recess.

The diaphragm portion 450 comprises a deformable elastic member of a rubber member or the like showing a cap-like shape. The diaphragm portion 450 is thickly formed with a peripheral edge portion 450a in a tongue-like shape brought into close contact with an inner wall portion of the accumulator chamber.

Such a diaphragm portion 450 partitions the accumulator chamber 45A into a brake fluid chamber 45B capable of storing the brake fluid and an atmospheric chamber 45C to which the atmospheric pressure is introduced, and is moved (deformed) by following increase/decrease of the brake fluid stored to the brake fluid chamber 45b to change a volume of the brake fluid chamber 45B.

The brake fluid chamber 45B is communicated with the vertical hole R26 (suction hydraulic pressure path F1) communicating with the pump 47A and communicated with a horizontal hole R27 communicating with the second accumulator 46. Thereby, the brake fluid is made to be able to flow in and flow out to and from the brake fluid chamber 45B.

Inside of the brake fluid chamber 45B includes the restricting member 452 brought into contact with the diaphragm portion 450 by following a decrease in the brake fluid for restricting deformation of the diaphragm portion 450.

The restricting member 452 comprises an upper member 452A having a section in a hat-like shape, and a lower member 452B attached to a bottom portion of the upper member 452A, and a storing space 452c of the brake fluid is provided between the upper member 452A and the lower member 452B in a state of fitting the lower member 452B to the upper member 452A. Further, the upper member 452A and the lower member 452B are formed with communicating holes 452a, 452b enabling to make the brake fluid flow therethrough.

Such a restricting member 452 is attached to the brake fluid chamber 45B by press-fitting a peripheral portion of the upper member 452A to an inner peripheral wall of the accumulator chamber 45A, and deformation of the diaphragm portion 450 is restricted by the lower member 452b.

The lid member 451 is provided with an outer diameter fitted to a portion of the accumulator chamber 45A formed with the atmospheric chamber 45C, and an upper portion thereof is provided with a pressing portion 451a for pressing the peripheral edge portion 450a of the diaphragm portion 450 to an inner wall portion of the accumulator chamber 45A. The lid member 451 includes an introducing portion 451c to which the atmosphere is introduced, and formed with an atmosphere communicating hole 451b communicated with the introducing portion 451c for applying the atmospheric pressure to a side of a bottom face of the diaphragm portion 450.

Further, the lid member 451 is fixed by a ring member 453, further, an opening portion of the accumulator chamber 45A is attached with a cap 454 capable of introducing the atmospheric pressure.

The second accumulator 46 is constituted such that a change in a volume thereof is larger than that of the first accumulator 45, and as a constitution therefor, two of the diaphragm portions 450 are provided on upper and lower sides centering on the restricting member 452.

The restricting member 452 is a member similar to that of the first accumulator, further, a similar member is used also for the lid member 451 on the lower side. A lid member 455 on the upper side is provided with a structure similar to that of the lid member 451 on the lower side, and includes an introducing portion 455a, an atmosphere communicating hole 455b, a pressing portion 455c.

Further, members similar to those of the first accumulator 45 are used for the ring member 453, the cap 454.

Further, a volume of an accumulator chamber 45A1 is formed to be larger than that of the first accumulator 45 to be able to contain two of the diaphragm portions 450 on upper and lower sides.

Further, the introducing portion 455a is communicated with an atmosphere introducing hole, not illustrated, to which the atmosphere is introduced. Further, the vertical hole R37 is made not to be communicated with the second accumulator 46.

The brake fluid returned by way of the vertical hole R29 is made to flow in to the first, the second accumulators 45, 46 to be stored to the respective brake fluid chambers 45B, 46Ba, 46B2. Further, when a brake fluid pressure is operated to the wheel brake B1 by operating the brake lever L1 (refer to FIG. 21) or the like, the brake fluid stored to the respective brake fluid chambers 45B, 46B1, 46B2 is sucked by the pump 47A to flow out to the vertical hole R26. At this occasion, the respective diaphragm portions 450 are deformed in accordance with flow out of the brake fluid and brought into contact with the restricting members 452 as indicated by broken lines in the drawing. That is, the diaphragm portion 450 is prevented from being deformed more than necessary by the restricting member 452.

Although a bottom portion of the second accumulator 46 is formed with the vertical hole R37 communicating with the pump hole 47b, the vertical hole R37 is inserted with a seal member 50A in a shape of a bottomed cylinder from a side of the bottom portion of the second accumulator 46, and a press-fit member 50B of a spherical body is press-fitted to the seal member 50A. Thereby, there is constituted a structure in which the second accumulator 46 and the pump hole 47b are made to be unable to communicate and the brake fluid is not made to flow therebetween.

FIG. 15 through FIG. 18 show modified examples of low pressure accumulators, portions similar to those of the first, the second accumulators 45, 46 are attached with the same notations.

Figure 15A:
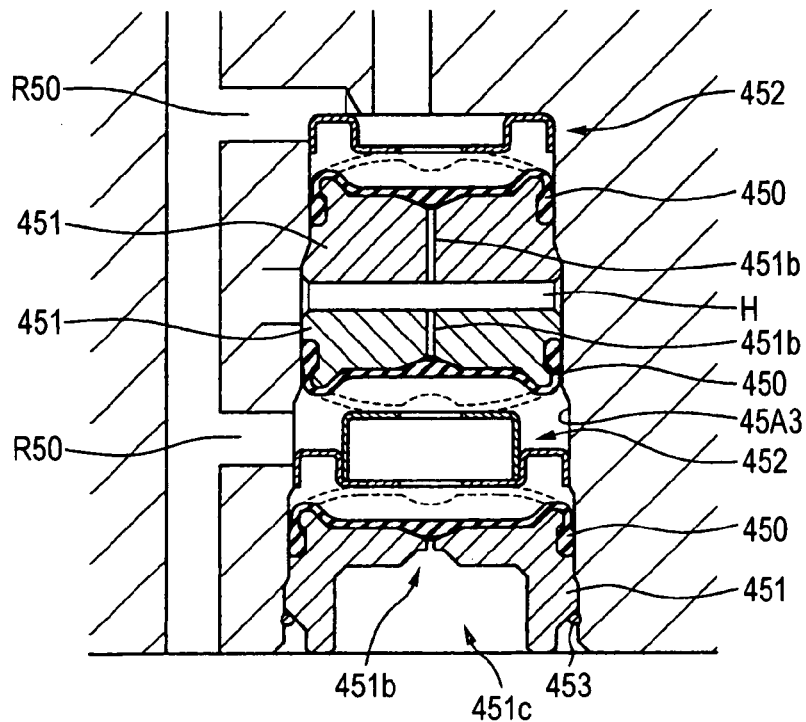
FIGS. 15A and 15B are sectional views showing a modified example of the low pressure accumulator.

According to an example shown in FIG. 15A, a volume related to flow in and flow out of the brake fluid is made to be larger than that of the second accumulator 46 (refer to FIG. 2, the same as follows), as a structure therefor, a volume of an accumulator chamber 45A3 is formed to be larger than that of the accumulator chamber 45A1 of the second accumulator 46 and three of the diaphragm portions 450 are provided on upper and lower sides. An introducing path H for introducing the atmosphere is provided between the lid member 451 at an upper portion and the lid member 451 at a middle portion. Further, two of flow paths R50 are provided on upper and lower sides as holes for making the brake fluid flow therethrough.

According to the low pressure accumulator, when the base member 100 is provided with a vertically long space, a number of holes necessary for the accumulator chamber can be reduced, thereby, small-sized formation of a total of the vehicle brake hydraulic pressure controller U can be achieved.

Figure 15B:
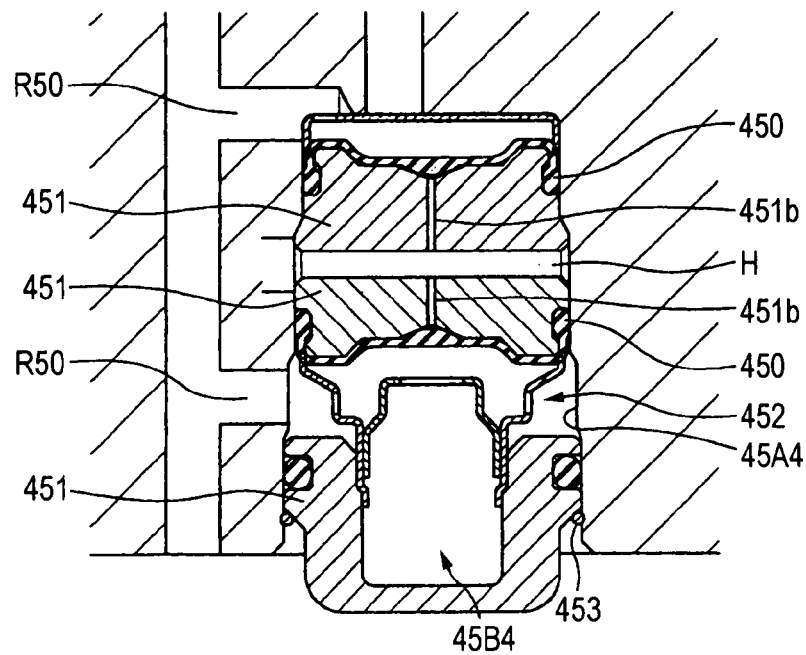

According to an example shown in FIG. 15B, in the example shown in FIG. 15A, two of the diaphragm portions 450 are constituted, by that amount, a volume of the accumulator chamber 45A4 is made to be smaller than the volume of the accumulator chamber 45A3. Further, according to the example, a storing amount of a brake fluid chamber 45B4 formed at a lower portion is increased.

Further, according to the low pressure accumulators shown in FIGS. 15A and 15B, the flow paths of the brake fluid formed at the base member 100 are laid out at positions in correspondence with the accumulator chambers 45A3, 45A4, and therefore, small-sized formation of the base member 100 can be achieved despite structures in which the volumes of the accumulator members 45A3, 45A4 are formed to be large.

Figure 16A:
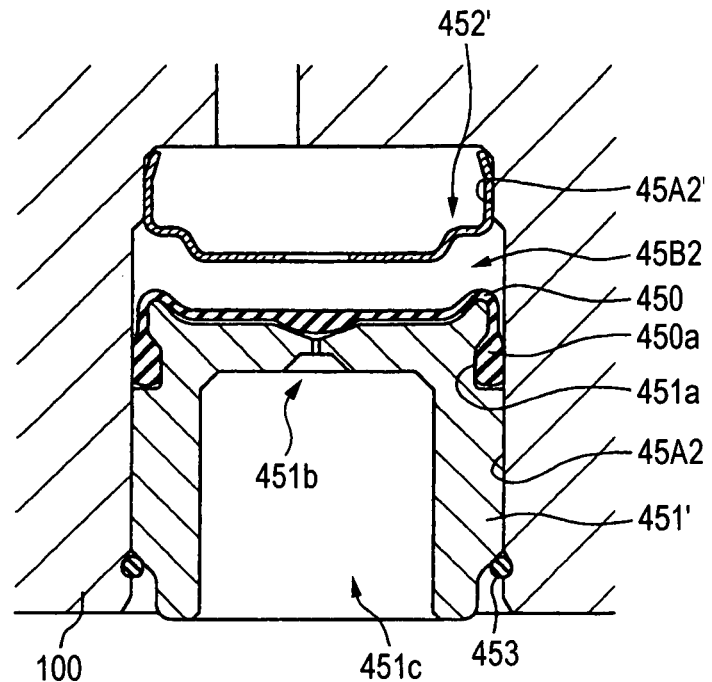
FIGS. 16A and 16B are sectional views showing other example of the low pressure accumulator.

According to the low pressure accumulator shown in FIG. 16A, similar the first, the second accumulators 45, 46, the peripheral edge portion 450a of the diaphragm portion 450 is pressed to be brought into close contact with the inner wall portion of the accumulator chamber 45A2 by a lid member 451'. Further, a restricting member 452' is constituted by a recess shape in a section thereof to be simplified in comparison with that of the restricting member 452 used in the first, the second accumulators 45, 46. Further, the restricting member 452' is fixed to the brake fluid chamber 45B2 by press-fitting a peripheral edge of an upper end portion thereof to a stepped peripheral wall 45A2' formed on a side of a bottom portion of the accumulator chamber 45A2. Further, a volume of the accumulator chamber 45A2 is made to be larger than that of the first accumulator 45, and set to be smaller than that of the second accumulator 46. Further, a volume of an accumulator chamber 45B2 is made to be substantially similar to that of the first accumulator 45.

Figure 16B:
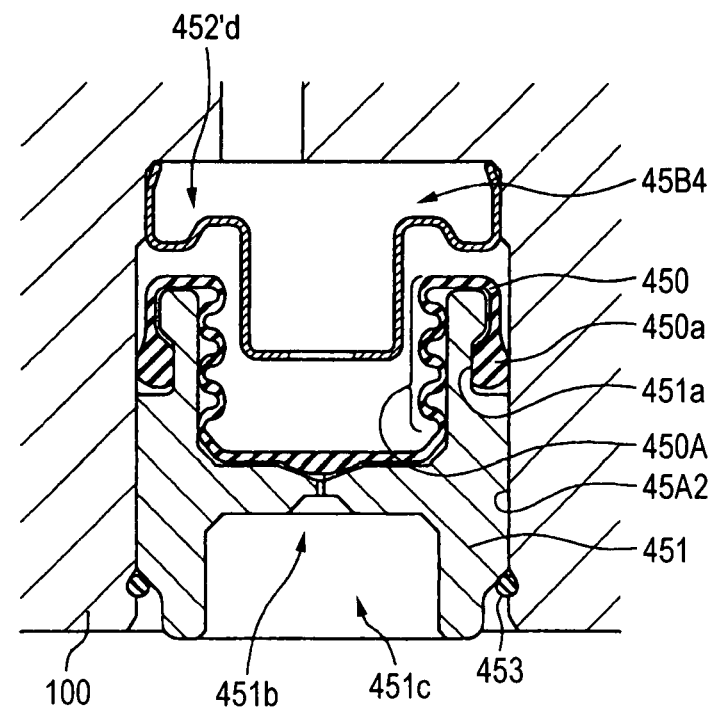

Further, the low pressure accumulator shown in FIG. 16B is constituted by further deforming the low pressure accumulator shown in FIG. 16A, the diaphragm portion 450 is provided with a bellows 450A, and by elongating and contracting the bellows portion 450A, the low pressure accumulator is moved (deformed) by following flow in and flow out of the brake fluid. According to the example, a volume of a brake fluid chamber 45B4 is made to be larger than that of the low pressure accumulator shown in FIG. 16A, by that amount, a restricting member 452'd is formed in a recess shape deeply in accordance with the diaphragm portion 450.

According to the low pressure accumulator, an amount of moving the diaphragm portion 450 can be increased by providing the bellows portion 450A, and therefore, the amount of storing the brake fluid is increased.

Figure 17:
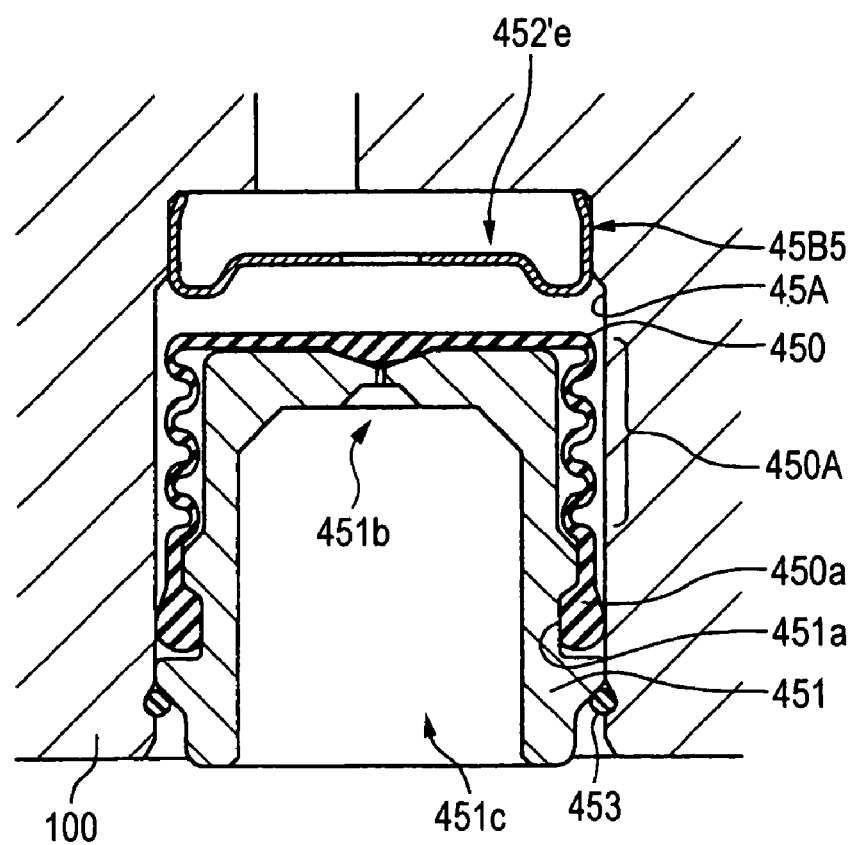
FIG. 17 is sectional views showing other example of the low pressure accumulator.

The low pressure accumulator shown in FIG. 17 is constituted by further deforming the low pressure accumulator shown in FIG. 16B, the shape of the diaphragm portion 450 is formed by a shape of a projection to the bottom portion to provide a bellows portion 450A. Also in this example, a restricting member 452'e is fixed by forming a stepped portion on the side of the bottom portion of the accumulator chamber 45A, further, the restricting member 452' e is constituted by a shape of being more or less projected to the bottom portion side more than the restricting member 452' of the low pressure accumulator shown in FIG. 16A. Thereby, the volume of a brake fluid chamber 45B5 is made to be smaller than that of the low pressure accumulator shown in FIG. 16A.

According to the low pressure accumulator, the bellows portions 450A is formed along the inner peripheral wall of the accumulator chamber 45A, and therefore, an amount of the brake fluid is further increased.

According to the respective low pressure accumulators shown in FIGS. 16A and 16B, FIG. 17, whereas according to the first, the second accumulators 45, 46 (refer to FIG. 12), the restricting member 452 is constituted by two members of the upper member 452A and the lower member 452B with an object of constituting the common shape, according to the constitution of the single low pressure accumulator, by constituting the constituent member 452' (452'd, 452'e) by the single member, the structure can be simplified and fabrication cost can be reduced, and a number of fabricating steps can be reduced.

Figure 18A:
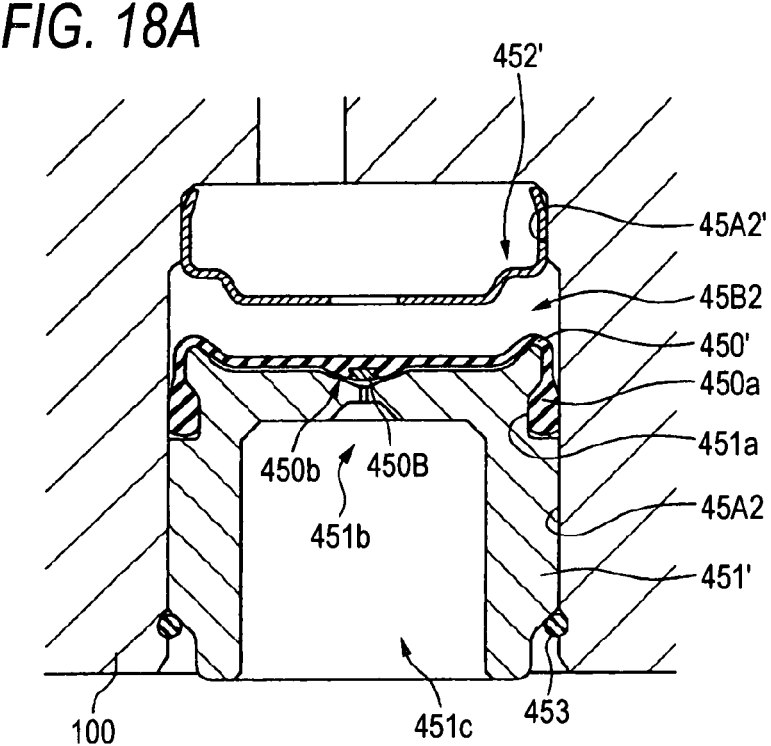
FIGS. 18A and 18B illustrate sectional views showing other example of the low pressure accumulators.

The low pressure accumulator shown in FIG. 18A is provided with a basic constitution similar to that of the low pressure accumulator shown in FIG. 16A and differs therefrom in that the bulged portion 450b provided at a lower portion of a center of the diaphragm portion 450' is integrally formed with a contact portion 450B comprising a member different from the diaphragm portion 450'. The contact portion 450B can be formed by, for example, a material made of metal or the like According to the low pressure accumulator, the diaphragm portion 450' is brought into contact with the lid member 451' by way of the contact portion 450B, and therefore, by presence of the contact portion 450B, it can be prevented that the diaphragm portion 450' bites inside of the atmosphere communicating hole 451b, thereby, durability of the diaphragm portion 450' can be promoted. Further, although not illustrated, there may be constructed a constitution in which a portion of the diaphragm portion 450' brought into contact with the restricting member 452' is provided with the contact portion 450B to promote the durability of the diaphragm portion 450' with regard to the restricting member 452'.

Figure 18B:
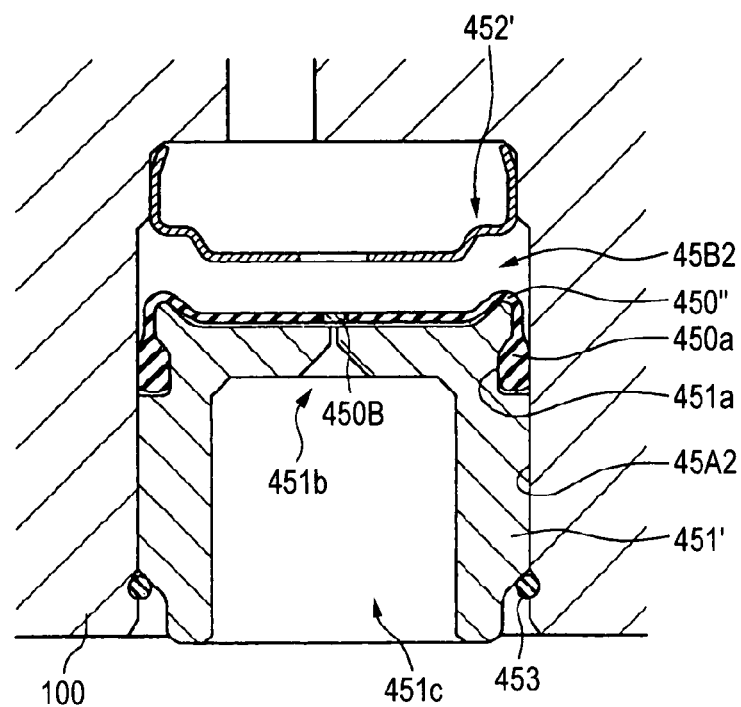

According to the low pressure accumulator shown in FIG. 18(b), a wall thickness of a center portion of a diaphragm portion 450" is thinly formed, and is provided with the contact portion 450B by being integrally molded therewith in a state of being exposed at two head and tail faces of the center portion.

According to the low pressure accumulator, by presence of the contact portion 450B, it can be prevented that the diaphragm portion 450B' bites inside of the atmosphere communicating hole 451b, thereby, durability of the diaphragm portion 450' can be promoted. Further, the diaphragm portion 450" can thinly be formed.

Next, the reservoir 44 and the pressurizing member 48 will be explained in reference to FIG. 19.

Figure 19:
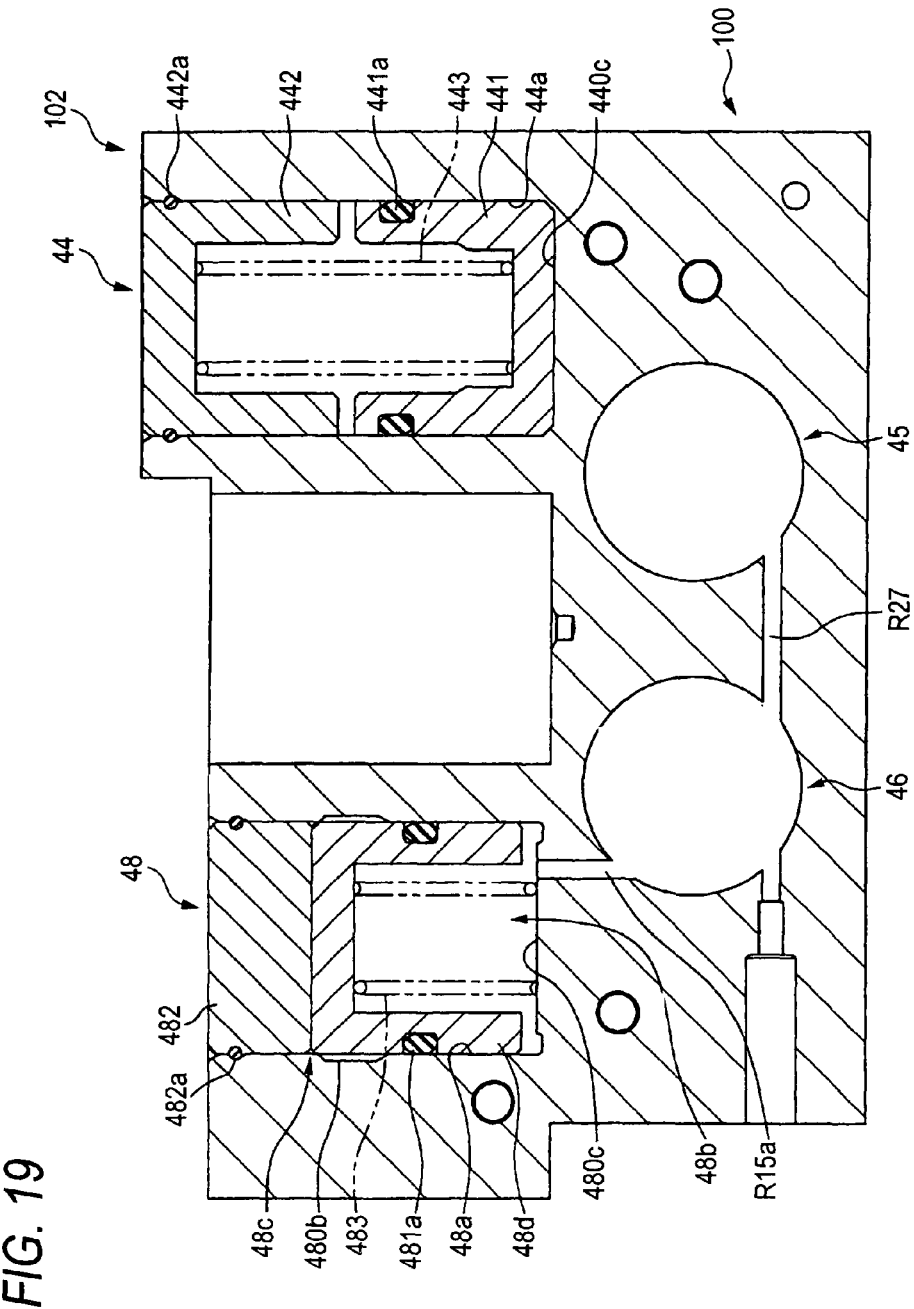
FIG. 19 is an enlarged sectional view showing a reservoir and a pressurizing member.

As shown by FIG. 19, the reservoir 44 is constituted by including a reservoir piston 441 substantially in a shape of a bottomed cylinder mounted to the reservoir mounting hole 44a, a spring receive member 442 substantially in a shape of a bottomed cylinder for closing the reservoir mounting hole 44a, and a reservoir spring 443 interposed between the reservoir piston 441 and the spring receive member 442 for urging the reservoir piston 441 to a bottom face side 440c of the reservoir mounting hole 44a. An outer peripheral face of the reservoir piston 441 is brought into contact with an inner wall face of the reservoir mounting hole 44a to form a space of storing the brake fluid by being slid to the side of the spring receive member 442 when the brake fluid flowing out from the wheel brake B1 flows in to the reservoir mounting hole 44a by way of a front/rear hole R44 (refer to FIG. 7). Further, the reservoir piston 441 is attached with an O ring 441a, further, the spring receive member 442 is fixed to the reservoir mounting hole 44a by a fixing ring 442a.

As shown by FIG. 19, the pressurizing member 48 is constituted by including the pressurizing piston 48d substantially in a shape of a bottomed cylinder partitioning inside of the pressurizing member mounting hole 48a into the brake fluid chamber 48b and the pressurizing chamber 48c, a lid member 482 for closing the pressurizing member mounting hole 48a, and a pressurizing member spring 483 interposed between the pressurizing piston 48d and a bottom face side 480c of the pressurizing member mounting hole 48a for urging the pressurizing piston 48d to a side of the lid member 482. An outer peripheral face of the pressurizing piston 48d is brought into contact with an inner wall face of the pressurizing member mounting hole 48a to make the brake fluid flow in or flow out to and from the brake fluid chamber 48b by way of the front/rear hole R15a (refer to FIG. 7). Further, the pressurizing chamber 48c of the pressurizing piston 48d is formed with a recess portion 480b communicating with the horizontal hole R15 (refer to FIG. 7), and the brake fluid from a side of the master cylinder C1 (refer to FIG. 21) is made to flow in to the recess portion 480b. Further, when the brake fluid from the side of the master cylinder C1 flows in to the pressurizing chamber 48c by way of the recess portion 480b, the pressurizing piston 48d is slid to the bottom face side 480c, and the brake fluid stored at inside of the brake fluid chamber 48b is delivered to the second accumulator 46 by way of the front/rear hole R15a (constituting the side of the suction hydraulic pressure path F1 (refer to FIG. 21)). Further, the pressurizing piston 48d is attached with an O ring 481a, further, the lid member 482 is fixed to the pressurizing member mounting hole 48a by a fixing ring 482a.

Next, the pumps 47A, 47B will be explained. The pumps 47A, 47B are constructed by the same constitution, and therefore, here, the pump 47A on one side will be explained in reference to FIG. 20.

Figure 20:
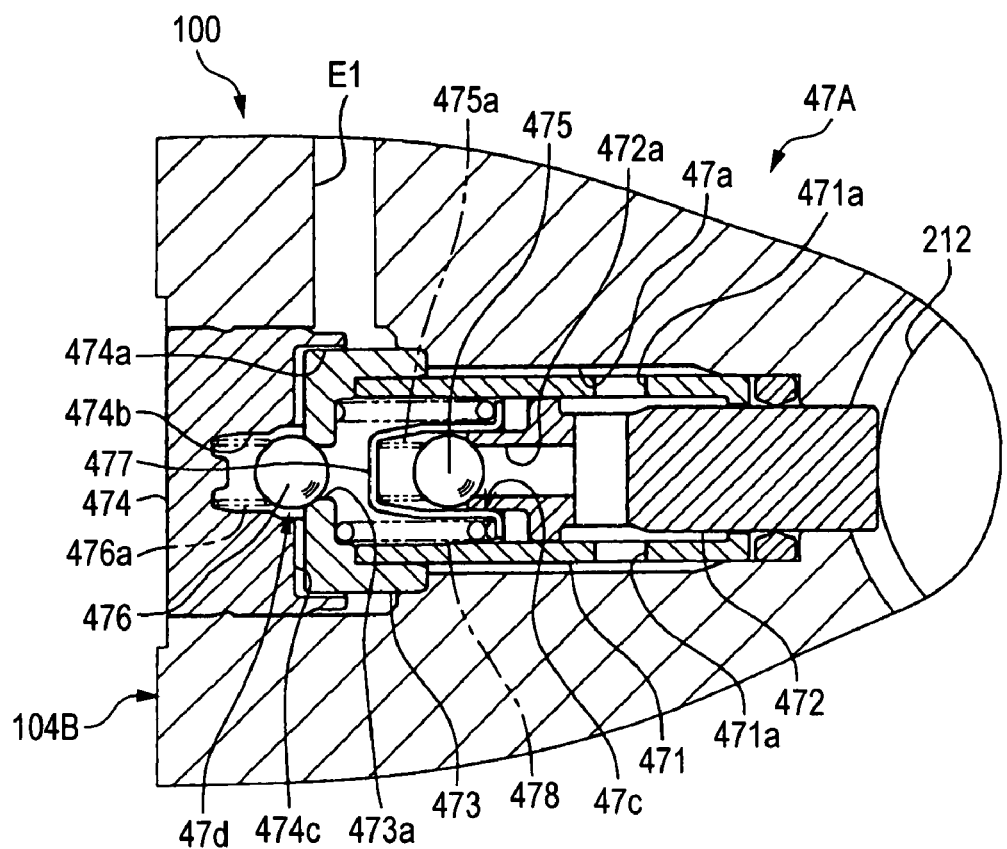
FIG. 20 is an enlarged sectional view showing a pump.

As shown by FIG. 20, the pump 47A is constituted by including a pump housing in a cylindrical shape inserted to the pump hole 47a, a plunger 472 which is slidably mounted to an inner portion of the pump housing 471 and one end of which is projected from one opening portion of the pump housing 471, a spring receive member 473 in a shape of a bottomed cylinder arranged to cover other opening portion of the pump housing 471, a lid member 474 for preventing from being drawn out from the pump hole 47a of the pump housing 471 or the like, a suction valve member 475 installed at an end face of the plunger 472 on a side of the spring receive member 473, a delivery valve member 476 installed to the opening portion 473a formed at a bottom wall of the spring receive member 473, a retainer 477 arranged to cover the suction valve member 475, and a return spring 478 arranged at a space between the plunger 472 and the spring receive member 473 in a compressed state for pressing the plunger 472 to a side of a ball bearing 212 by a recovery force thereof.

An end portion of the pump housing 471 on the side of the lid member 474 is insertingly fitted to the spring receive member 473, and an end portion on a side opposed thereto is insertingly fitted to a depth portion of the pump hole 47a. A side wall of the pump housing 471 is formed with the through hole 471a communicating with an inner portion. Inside of the plunger 472 is formed with a flow path 472a opened to the side face and an end face. The lid member 474 is formed with a large diameter recess portion 474a to which the spring receive member 473 is insertingly fitted, and a small diameter recess portion 474b formed at a center portion of the large diameter recess portion 474a, and is formed with a recess groove 474c constituting a flow path of the brake fluid along an inner face of the large diameter recess portion 474a. The recess groove 474c functions as an orifice. The suction valve member 475 functions as the suction valve 47c shown in FIG. 21, arranged to close the flow path 472a of the plunger 472, and is urged to a side of the spring receive member 473 by a recovery force of a delivery valve spring 476a provided on a inner side of the small diameter recess portion 474b of the lid member 474 in a compressed state.

Further, by reciprocating the plunger 472 by being caused by an eccentric movement of the ball bearing 212, the brake fluid sucked by way of the through hole 471a of the pump housing 471 is delivered to the delivery hydraulic pressure path E1 (refer to FIG. 21) by passing the flow path 472a of the plunger 472, the opening portion 473a of the spring receive member 473 and the recess groove 474c of the lid member 474.

Successively, a detailed explanation will be given of an actual flow of the brake fluid in normal time, in antilock brake control time, and a interlocking brake control time in reference to FIG. 5 through FIG. 10. Further, in the following explanation, there will be exemplified a case in which the output hydraulic pressure path A1 and the output hydraulic pressure path A2 are shut off by closing the shut-off valve X and the master cylinder C1 and the dummy cylinder 30 of the stroke simulator Si are communicated by opening the opening/closing valve 31.

(Normal Brake Time)

First, a flow of the brake fluid at the stroke simulator Si will be explained in reference to FIG. 7. In normal brake control time, and in antilock brake control time, the inlet port 21 is communicated with the opening/closing valve mounting hole 31a of the opening/closing valve 31 by way of the front/rear hole R1, the horizontal hole R2, the vertical hole R3, the front/rear hole R4, the horizontal hole R5, the front/rear hole R6, the first hydraulic pressure sensor mounting hole 11a, the vertical hole R7, since the opening/closing valve 31 mounted to the mounting hole is brought into the opened state, the inlet port 21 is communicated with the dummy cylinder 30 by way of the front/rear hole R8 (refer to FIG. 8), the vertical hole R9, the front/rear hole R10, the horizontal hole R11. Therefore, when a driver operates the brake lever L1 (refer to FIG. 21, the same as follows), the brake fluid pressure generated by the master cylinder C1 is transmitted to the dummy cylinder 30 of the stroke simulator Si by way of the inlet port 21, as a result, the operation reaction force in accordance with the operating force of the brake lever L1 is applied to the brake lever L1.

At that occasion, the inlet port 21 is communicated with the first hydraulic pressure sensor mounting hole 11a by way of the flow path, and therefore, the brake hydraulic pressure on the side of the master cylinder C1 of the shutoff valve X is detected by the first hydraulic pressure sensor 11.

On the other hand, the inlet port 21 is communicated with the pressurizing member mounting hole 48a of the pressurizing member 48 by way of the front/rear hole R1, the horizontal hole R12, the vertical hole R13, the front/rear hole R14, the horizontal hole R15. Therefore, when an operator operates the brake lever L1, the brake hydraulic pressure generated by the master cylinder C1 is transmitted to the pressurizing member 48 by way of the inlet port 21, as a result, the brake hydraulic pressure on the side of the master cylinder C1 of the shut-off valve X is directly applied to the pressurizing member 48. Then, the pressurizing piston 48d of the pressurizing member 48 (refer to FIG. 19) is pressed by the brake hydraulic pressure to make a stroke, the brake fluid stored in the brake fluid chamber 48b of the pressurizing member 48 is delivered to the second accumulator 46 by passing the front/rear hole R15a.

In the transmitting path of the brake fluid transmitted to the regulator 40, the brake fluid is transmitted from the second accumulator 46 to the first accumulator 45 by passing the horizontal hole R27, thereafter, as shown by FIG. 8, transmitted from the vertical hole R20 to the pump hole 47a. Here, the brake fluid is transmitted from the pump hole 47a also the check valve 40a of the regulator 40 (refer to FIG. 21, the same as follows), as the transmission, as shown by FIG. 7, the brake fluid is transmitted to the cut valve mounting hole 41a from the front/rear hole R20a to the vertical hole 25, transmitted from the check valve 40a of the regulator 40 as shown by FIG. 8, from the horizontal hole R28 to the vertical hole R19 by way of the front/rear hole R24 and is transmitted again to the pump hole 47a.

Further, the brake fluid is transmitted from the pump hole 47a to the front/rear hole R21 by passing the front hole R20, thereafter, reaches the horizontal hole R22 from the inlet valve mounting hole 42a by passing the inlet valve 42, further, transmitted to the outlet port 22 by passing the vertical hole R23. Thereby, the brake fluid pressure from the pressurizing member 48 is added to the brake fluid pressure delivered from the pump 47A.

At this occasion, as shown by FIG. 20, the brake hydraulic pressure transmitted to the pump hole 47a flows in to the flow path 472a from the through hole 471a of the pump 47a, presses the suction valve member 475 against the urge force of the suction valve spring 475a, and is transmitted to the opening portion 473a of the spring receive member 473 from the retainer 477. Further, the brake fluid pressure further presses the delivery valve member 476 against the urge force of the delivery valve spring 476a and is outputted from the small diameter recess portion 474b bypassing the large diameter recess portion 474a. Thereby, by operating the brake lever L1, the brake fluid pressure outputted by the side of the master cylinder C1 is transmitted to the delivery hydraulic pressure path A1 on the side of the modulator Mo.

(Antilock Brake Control Time)

Figure 9:
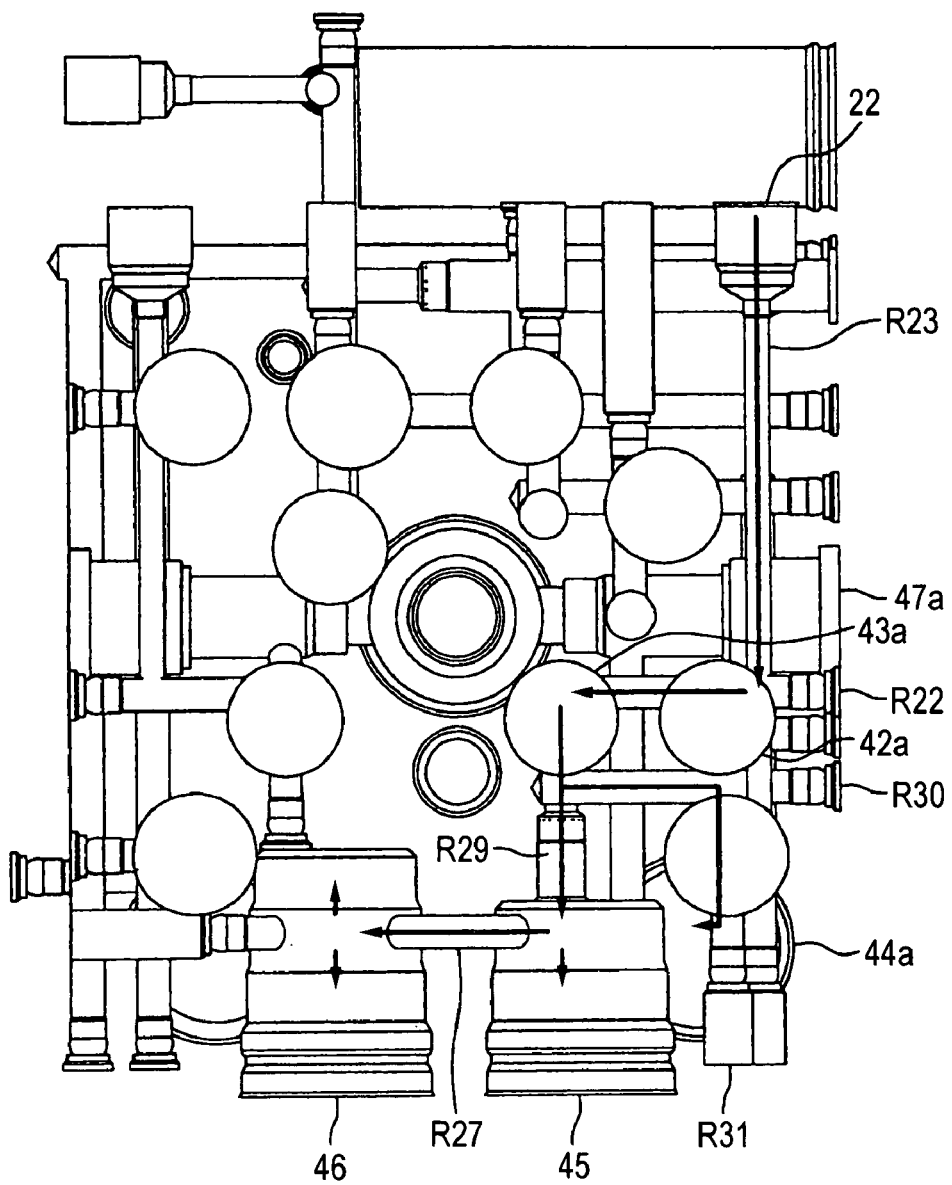
FIG. 9 is an explanatory view showing a flow of a brake fluid.

When the brake fluid pressure operated to the wheel brake B1 is reduced by the antilock brake control, as shown by FIG. 9, the brake fluid from the wheel brake B1 (refer to FIG. 21) by way of the outlet port 22 is made to flow in to the outlet valve mounting hole 43a byway of the vertical hole R23, the horizontal hole R22, and is made to flow in to the reservoir mounting hole 44a by passing the vertical hole R31 from the vertical hole R29, the horizontal hole R30 by way of the outlet valve 43. On the other hand, the brake fluid made to flow in to the reservoir 44 from the reservoir mounting hole 44a flows in to the first accumulator 45 from the reservoir 44 by passing the vertical hole R31, the horizontal hole R30 and further passing the vertical hole R29, further, flows in to the second accumulator 46 by passing the front hole R27. Thereby, the brake fluid pressure operated to the wheel brake B1 is reduced.

Further, when the brake fluid pressure operated to the wheel brake B1 is increased by the antilock brake controls the inlet valve 42 is brought into the valve opening state and the outlet valve 43 is brought into the valve closing state, as shown by FIG. 5, the brake fluid is sucked to the pump 47a from the first, the second accumulators 45, 46 by passing the vertical hole P26, as shown by FIG. 6, flows in to the inlet valve mounting hole 42a from the pump hole 47a by passing the vertical hole R19, the horizontal hole R20 and further passing the front/rear hole R21. Further, as shown by FIG. 7, the brake fluid is made to flow out to the outlet port 22 by passing the vertical hole R23.

(Interlocking Brake Control Time)

Figure 10:
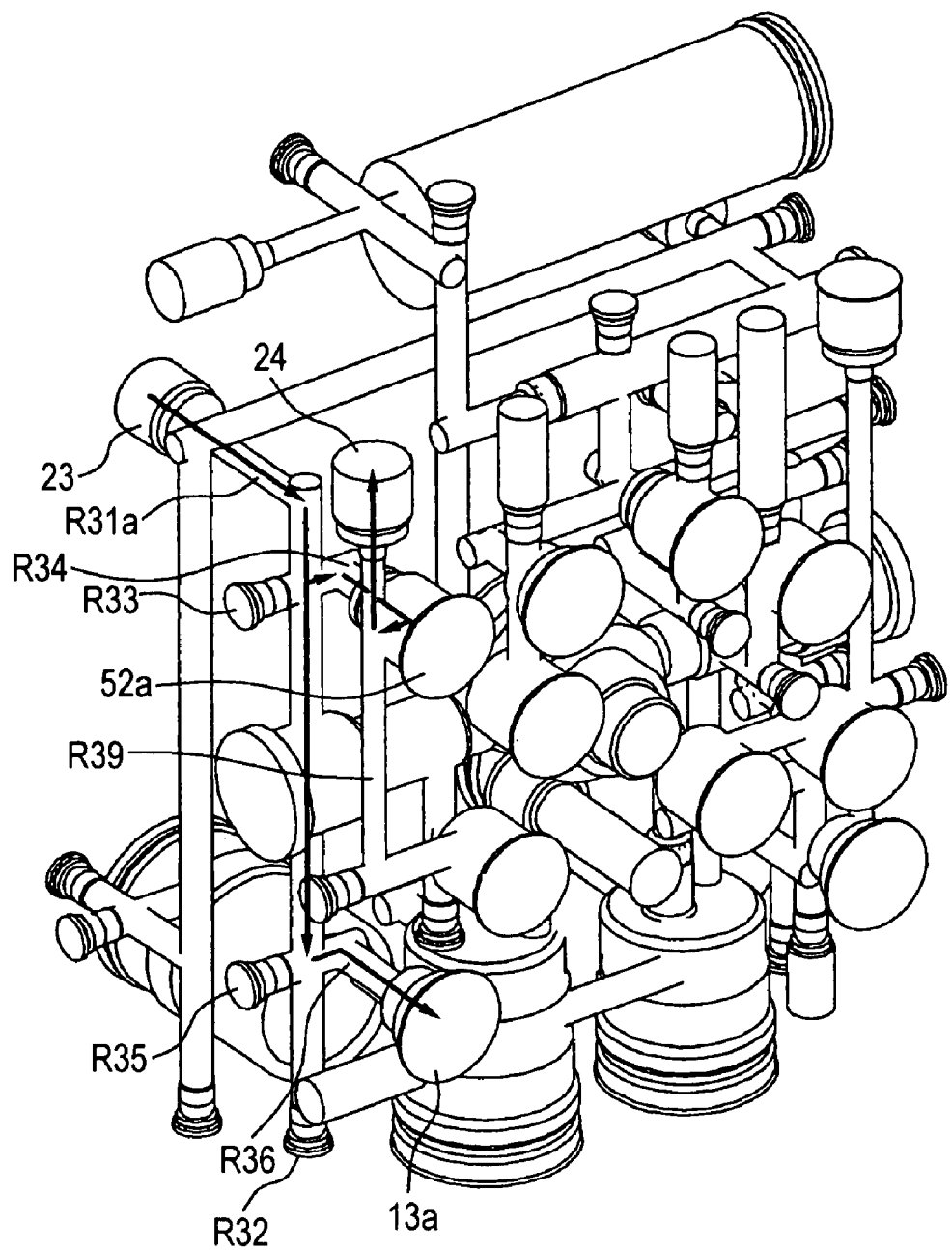
FIG. 10 is an explanatory view showing the flow of the brake fluid.
Figure 11:
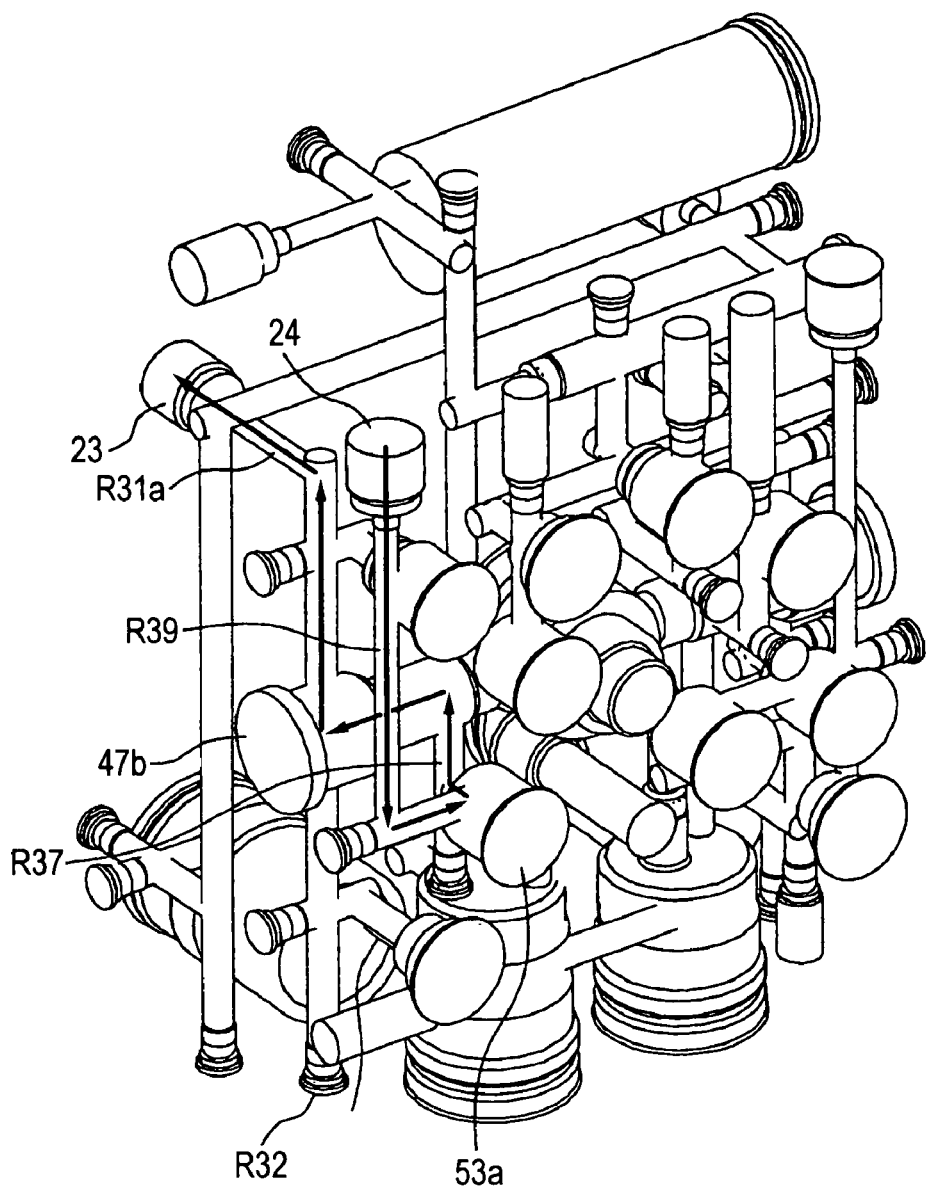
FIG. 11 is an explanatory view showing the flow of the brake fluid.

For example, when the driver operates the brake pedal L2 to brake the rear wheel, the brake fluid pressure from the master cylinder C2 (refer to FIG. 24) flows in from the inlet port 23 to the third hydraulic pressure sensor mounting hole 13a by passing the front/rear hole R31a, the vertical hole R32, the horizontal hole R35 and the front/rear hole R36 as shown by FIG. 10, and the brake fluid pressure on the rear wheel side is detected by the third hydraulic pressure sensor 13. Further, the brake fluid is made to flow in to the inlet valve mounting hole 52a by passing the vertical hole R32, the horizontal hole R33 and the front/rear hole R35 and is made to flow out to the outlet port 24 by passing the vertical hole R39.

On the other hand, in the brake system K1 on the front wheel side, as described above, the cut valve 41 is excited to be brought into the valve closing state, and the inlet valve 42 is brought into the valve opening state. Further, the brake fluid present at the first, the second accumulators 45, 46 is sucked by the pump 47a and is made to flow out from the vertical hole R23 to the outlet port 22 as shown by FIG. 5 similar to the operation in the normal brake control time until a pressure value measured by the second hydraulic pressure 12 reaches the target pressure value. Thereby, the front wheel side is braked cooperatively with the brake operation on the rear wheel side.

According to the vehicle brake hydraulic pressure controller U of the embodiment explained above, the dummy cylinder 30 needing the large volume to achieve the predetermined operation reaction force in the stroke simulator Si, and the pumps 47A, 47B similarly needing the comparatively large containing spaces in the base member 100 are aligned at the base member 100 by making the access lines O1, O2 in the longitudinal direction being substantially in parallel with each other, and therefore, members occupying large spaces at inside of the valve member 100 are settled well, space saving formation is achieved, which contributes to prevent the apparatus from being large-sized.

Further, the base member 100 is provided with the constitution in which the output hydraulic pressure path A2 communicated from the master cylinder C1 to the side of the wheel brake B1 is shut off by the shut-off valve X in operating the pumps 47A, 47B, in members mounted to the base member 100, the reservoir 44 and the pressurizing member 48 needing cooperatively large containing spaces are mounted to the base member 100 from the side of the rear face 102 (rear portion side) of the base member 100, and therefore, the space provided by that amount can be utilized for forming the flow path for arranging other member, which can achieve small-sized formation of the apparatus.

Further, back pressure sides of the regulator 40 and the pressurizing member 48 provided at the flow path are provided with the first, the second accumulators 45, 46 for containing the brake fluid, and therefore, the brake fluid on the back pressure sides can be stored in the first, the second accumulators 45, 46. Further, the first, the second accumulators 45, 46 are provided at the lower portion of the base member 100, and therefore, in view of layout, the space for storing the brake fluid is easy to be ensured, and therefore, the volumes of the first, the second accumulators 45, 46 are easy to be set.

Further, the respective members can be arranged by effectively utilizing the spaces on the upper side and on the lower side of the motor 200, and therefore, wasteful spaces are not formed on the upper side and on the lower side of the motor 200, an efficient part arrangement can be realized to enable further small-sized formation.

Further, the first, the second accumulators 45, 46 are provided to the bottom face side 480c (bottom portion side) of the pressurizing member 48 and the bottom face side 440c (bottom portion side) of the reservoir 44, and therefore, the efficient part arrangement can be realized by preventing interference among the parts at the lower portion of the base member 100. Therefore, the function of storing the brake fluid can be promoted by increasing volumes of the members.

Although the embodiment of the invention has been explained as described above, the invention is not limited to the above-described embodiment but can be embodied by being pertinently modified.

For example, the portion of the base member 100 provided with the dummy cylinder 30 may be extended to the rear side to be proximate to the rear face side of the motor 200, and other member or the flow path may be arranged at the extended portion.

Furthermore, according to the low pressure accumulator of the embodiment explained above, insides of the accumulator chambers 45A are respectively provided with the diaphragm portions 450 moved by following increase/decrease of the brake fluid stored to the brake fluid chambers 45B, 46B1, 46B2 for changing volumes of the brake fluid chambers 45B, 46B1, 46B2, and therefore, when the brake fluid flows in to the brake fluid chambers 45B, 46B1, 46B2, the respective diaphragm portions 450 are deformed by following the flow in and the brake fluid is received. Further, when the brake fluid flows out from the brake fluid chambers 45B, 46B1, 46B2, the respective diaphragm portions 450 are deformed by following the flow out and the brake fluid is permitted to flow out.

Therefore, flow in and flow out of the brake fluid can be dealt with without needing a stroke structure of a piston present in a reservoir tank of a background art to contribute to compact formation of the base member 100 of the brake hydraulic pressure controller U.

Further, the brake fluid chambers 45B, 46B1, 46B2 are provided with the restricting members 452 brought into contact with the diaphragm portions 450 for restricting the diaphragm portions 450 from being moved, and therefore, it is prevented that the diaphragm portions 450 are moved (deformed) more than necessary in accordance with flow in and flow out of the brake fluid and durability is promoted.

Further, in integrating the lid member 451 to the accumulator chamber 45A, by attaching the lid member 451 to the inner wall portion by interposing the peripheral edge portion 450a of the diaphragm portion 450 between the pressing portion 451a of the lid member 451 and the inner wall portion of the accumulator chamber 45A, the diaphragm portion 450 can simultaneously be attached to the accumulator chamber 45A. Therefore, it is not necessary to use other member for fixing the diaphragm portion 450 and a reduction in a number of parts can be carried out. Further, also a time period required for integrating the diaphragm portion 450 can be shortened.

Here, the peripheral edge portion 450a achieves a seal function for preventing the brake fluid from being leaked out by being interposed between the pressing portion 451a of the lid member 451 and the inner wall portion of the accumulator chamber 45A.

Further, the second accumulator 46 is provided with the two brake fluid chambers 46B1, 46B2 on the both sides of the restricting member 452, and therefore, more of the brake fluid can be stored. Thereby, more of the brake fluid can be stored at a limited space of the base member 100 in the vehicle brake hydraulic pressure controller U to contribute to promote a brake performance in the brake hydraulic pressure controller U.

Further, the brake fluid can be made to flow between the two brake fluid chambers 46B1, 46B2 by way of the communicating holes 452a, 452b, and therefore, the two diaphragm portions 450 of the two brake fluid chambers 46B1, 46B2 can cooperatively be moved in flow in and flow out of the brake fluid, and a following performance of the two diaphragm portions 450 can be promoted.

Further, even in a state of shutting off the output hydraulic pressure paths A1, A2 connecting the side of the master cylinder C1 and the side of the wheel brake B1 (bi-wire control time), the brake control of the wheel brake B1 by the pump 47A can preferably be carried out without communicating the side of the master cylinder C1 and the side of the wheel brake B1.

Although the explanation has been given of the embodiment of the invention, the invention can be embodied by being pertinently modified without being limited to the embodiment.

For example, the first, the second accumulators 45, 46 can be set by pertinently selecting the shape or the number of pieces of installing the diaphragm portions 450. Further, the diaphragm portion 450 may be formed by a member made of a metal in order to promote durability.

What is claimed is:

1. A vehicle brake hydraulic pressure controller including a brake system that brakes a wheel brake and a stroke simulator including a dummy cylinder that exerts an operation reaction force in accordance with an operation state of a brake operation element, the vehicle brake hydraulic pressure controller comprising:
   a base member constituted with a flow path in correspondence with the brake system;
   a plurality of electromagnetic valves attached to a one face of the base member, the electromagnetic valves controlling a flow of a brake fluid in the flow path;
   a motor attached to an other face constituting a back face side of the one face of the base member; and
   a first pump attached to a first side face contiguous to the one face of the base member and a second pump attached to a second side face contiguous to the one face of the base member, the first pump and the second pump being driven by the motor and delivering the brake fluid to the flow path,
   wherein the dummy cylinder of the stroke simulator and the first pump and the second pump are aligned at the base member with axis lines thereof in a longitudinal direction being substantially in parallel with each other.

2. The vehicle brake hydraulic pressure controller according to claim 1, wherein the first side face and the second side face are on opposite sides of the base member.

3. The vehicle brake hydraulic pressure controller according to claim 1, wherein the first pump and the second pump are on sides of the base member, both of which are contiguous with the back face side of the base member.

4. The vehicle brake hydraulic pressure controller according to claim 1, wherein the first pump and the second pump have flow paths running perpendicular to the axis lines in the longitudinal direction, which connect to a first accumulator and a second accumulator, respectively.

5. The vehicle brake hydraulic pressure controller according to claim 1, wherein the first pump and the second pump are axially aligned with each other.

6. The vehicle brake hydraulic pressure controller according to claim 1, wherein the stroke simulator is arranged at an upper position of the motor and a pressurizing member and reservoir are arranged at a lower position of the motor.

7. The vehicle brake hydraulic pressure controller according to claim 6, wherein the upper position and the lower position are on opposite sides of the motor.

8. The vehicle brake hydraulic pressure controller according to claim 6, wherein the pressurizing member is attached to the back face side of the base member.

9. The vehicle brake hydraulic pressure controller according to claim 8, wherein a longitudinal axis of the pressurizing member is substantially perpendicular with the axis lines in the longitudinal direction of the dummy cylinder of the stroke simulator and the first pump and the second pump.

10. The vehicle brake hydraulic pressure controller according to claim 6, wherein a longitudinal axis of the pressurizing member is substantially parallel with axis lines in the longitudinal direction of the plurality of electromagnetic valves.

11. A vehicle brake hydraulic pressure controller including a brake system that brakes a wheel brake and a stroke simulator including a dummy cylinder that exerts an operation reaction force in accordance with an operation state of a brake operation element, the vehicle brake hydraulic pressure controller comprising:
    a base member constituted with a flow path in correspondence with the brake system;
    a plurality of electromagnetic valves attached to a one face of the base member, the electromagnetic valves controlling a flow of a brake fluid in the flow path;
    a motor attached to an other face constituting a back face side of the one face of the base member; and
    a pump attached to a side face contiguous to the one face of the base member, the pump being driven by the motor and delivering the brake fluid to the flow path,
    wherein the dummy cylinder of the stroke simulator and the pump are aligned at the base member with axis lines thereof in a longitudinal direction being substantially in parallel with each other, and further comprising:
    an output hydraulic pressure path communicated to a side of the wheel brake from a master cylinder as the flow path, the vehicle brake hydraulic pressure controller further comprising:
    a shut-off valve which shuts off the output hydraulic pressure path in an operation state of the pump;
    a reservoir provided at the flow path, the reservoir storing the brake fluid; and
    a pressurizing member which applies a pressure to a hydraulic pressure path communicated at least with the wheel brake by a stroke of a pressurizing piston, said stroke being activated by receiving a brake hydraulic pressure that is generated on a side of the master cylinder by operating the brake operation element,
    wherein the reservoir and the pressurizing member are mounted to the base member from an other face of a front face and a rear face of the base member.

12. The vehicle hydraulic pressure controller according to claim 11,
    wherein a low pressure accumulator that contains the brake fluid is provided on back face sides of a regulator and the pressurizing member provided at the flow path,
    wherein the low pressure accumulator is arranged at a lower portion of the base member.

13. The vehicle brake hydraulic pressure controller according to claim 11,
    wherein the stroke simulator is arranged at an upper position of the motor,
    the pressurizing member and the reservoir are arranged at a lower position of the motor, and
    the base member accommodates the stroke simulator, the pressurizing member and the reservoir and shows a channel-like shape in a side view thereof.

14. The vehicle brake hydraulic pressure controller according to claim 12,
    wherein the pressurizing piston is provided at inside of a bottomed recess shape housing, wherein the low pressure accumulators are provided on a side of a bottom portion of the pressurizing member and a side of a bottom portion of the reservoir.

15. The vehicle brake hydraulic pressure controller according to claim 12, wherein the low pressure accumulator comprises;
an accumulator chamber in a bottomed recess shape;
a diaphragm portion provided at inside of the accumulator chamber, the diaphragm portion partitioning the accumulator chamber to a brake fluid chamber that stores the brake fluid and an atmosphere chamber to which an atmospheric pressure is introduced, being moved by following an increase or a decrease of the brake fluid stored to the brake fluid chamber, and changing a volume of the brake fluid chamber;
a lid member provided at the atmosphere chamber of the accumulator chamber and formed with an atmosphere communicating hole; and
a restricting member provided at the brake fluid chamber, which restricts the diaphragm portion from being moved by being brought into contact with the diaphragm portion moved by following the decrease in the brake fluid.

16. The vehicle brake hydraulic pressure controller according to claim 15,
wherein the diaphragm portion includes a peripheral edge portion brought into close contact with the inner wall portion of the accumulator chamber;
wherein the lid member includes a pressing portion that presses the peripheral edge portion of the diaphragm portion toward the inner wall portion of the accumulator chamber to be brought into close contact therewith.

17. The vehicle brake hydraulic pressure controller according to claim 15,
wherein the accumulator chamber includes two of the diaphragm portions and two of the lid members, by arranging the two diaphragm portions in an axis line direction of the accumulator chamber centering on the restricting member so as to be spaced apart from each other by an interval therebetween, the two brake fluid chambers are provided on both sides of the restricting member, and
wherein the lid members are provided at two of the atmosphere chambers formed at the accumulator chamber by the two diaphragm portions.

18. The vehicle brake hydraulic pressure controller according to claim 17, wherein the restricting member is provided with a communicating hole that enables the brake fluid to flow between the two brake fluid chambers.

19. The vehicle brake hydraulic pressure controller according to claim 15,
wherein the diaphragm portion comprises a contact portion that closes the atmosphere communicating hole, the contact portion being made of member different from the diaphragm portion and being integrally molded with the diaphragm portion.

20. The vehicle brake hydraulic pressure controller according to claim 15,
wherein the brake system can apply a brake hydraulic pressure to the wheel brake in a state of shutting off the flow path,
wherein the brake fluid chamber is provided with a volume capable of storing a brake fluid amount necessary for pressing the wheel brake in a state of shutting off the flow path.

* * * * *